United States Patent
Lee et al.

(10) Patent No.: US 9,794,999 B2
(45) Date of Patent: Oct. 17, 2017

(54) COLOR TUNABLE LIGHT SOURCE MODULE WITH BRIGHTNESS AND DIMMING CONTROL

(71) Applicant: LedEngin, Inc., San Jose, CA (US)

(72) Inventors: Kachun Lee, Fremont, CA (US);
Xiantao Yan, Palo Alto, CA (US);
Zequn Mei, Fremont, CA (US)

(73) Assignee: LedEngin, Inc., San Jose, CA (US)

( * ) Notice: Subject to any disclaimer, the term of this patent is extended or adjusted under 35 U.S.C. 154(b) by 0 days.

(21) Appl. No.: 14/244,789

(22) Filed: Apr. 3, 2014

(65) Prior Publication Data
US 2014/0300284 A1    Oct. 9, 2014

Related U.S. Application Data

(60) Provisional application No. 61/808,603, filed on Apr. 4, 2013.

(51) Int. Cl.
*H05B 37/00*        (2006.01)
*H05B 39/00*        (2006.01)
(Continued)

(52) U.S. Cl.
CPC ....... *H05B 33/086* (2013.01); *H05B 33/0815* (2013.01); *H05B 33/0827* (2013.01);
(Continued)

(58) Field of Classification Search
CPC ............ H05B 33/0815; H05B 33/0845; H05B 33/0842; H05B 33/086; H05B 33/0857;
(Continued)

(56) References Cited

U.S. PATENT DOCUMENTS 6,016,038 A    1/2000  Mueller
8,598,809 B2   12/2013 Negley
(Continued)

FOREIGN PATENT DOCUMENTS

EP     1234140 B1    8/2002
EP     1610593 B1    12/2005

OTHER PUBLICATIONS

Office Action mailed Jun. 5, 2015 in U.S. Appl. No. 14/244,787, 20 pages.
(Continued)

*Primary Examiner* — Alexander H Taningco
*Assistant Examiner* — Christian L Garcia
(74) *Attorney, Agent, or Firm* — Kilpatrick Townsend & Stockton, LLP

(57) ABSTRACT

LED-based light source modules can incorporate color tunability and brightness control, allowing a user to select a desired color temperature and/or brightness and to change either or both dynamically. An emitter can include multiple independently addressable groups of LEDs, each emitting light of a different color. By controlling the relative operating current provided to each group, a desired color temperature can be achieved, and by controlling the absolute operating currents, the brightness of the output light can be controlled. Pulse width modulation (PWM) can be used to control the relative and absolute operating currents. Smooth, gradual transitions between brightness and/or color temperature settings in response to changes can be provided.

21 Claims, 12 Drawing Sheets

(51) Int. Cl.
*H05B 41/00* (2006.01)
*H05B 33/08* (2006.01)
*H05B 37/02* (2006.01)

(52) U.S. Cl.
CPC ...... *H05B 33/0818* (2013.01); *H05B 33/0842* (2013.01); *H05B 33/0845* (2013.01); *H05B 33/0857* (2013.01); *H05B 37/02* (2013.01); *Y02B 20/346* (2013.01)

(58) Field of Classification Search
CPC .... H05B 37/02; Y02B 20/346; Y02B 20/347; Y02B 20/345; G09G 2320/064
See application file for complete search history.

(56) References Cited

U.S. PATENT DOCUMENTS

| | | | | |
|---|---|---|---|---|
| 2004/0155608 | A1* | 8/2004 | Trinschek | G09G 3/14 315/291 |
| 2006/0176693 | A1* | 8/2006 | Walter | H05B 33/0803 362/231 |
| 2008/0048582 | A1* | 2/2008 | Robinson | H03K 7/08 315/291 |
| 2008/0054825 | A1* | 3/2008 | Gulsen | H05B 41/3921 315/307 |
| 2009/0189530 | A1* | 7/2009 | Ashdown | H05B 33/0818 315/152 |
| 2012/0043910 | A1* | 2/2012 | Nagashima | H05B 33/086 315/294 |
| 2013/0049634 | A1* | 2/2013 | Neudorf | H05B 33/0866 315/294 |
| 2013/0063042 | A1 | 3/2013 | Bora | |
| 2014/0062321 | A1* | 3/2014 | McMahon | H05B 33/0842 315/192 |
| 2014/0230841 | A1 | 8/2014 | Mathonneau | |
| 2014/0239841 | A1* | 8/2014 | Gilman | H05B 33/086 315/250 |
| 2015/0029713 | A1 | 1/2015 | Fieberg et al. | |

OTHER PUBLICATIONS

Office Action mailed Apr. 8, 2016 in U.S. Appl. No. 14/244,787, 19 pages.

* cited by examiner

|       | Dither Mask 1100 |
|-------|------------------|
| LSBs 1102 |              |
| 000:  | 0 0 0 0 0 0 0 0  |
| 001:  | 0 0 0 0 0 0 0 1  |
| 010:  | 0 0 0 1 0 0 0 1  |
| 011:  | 0 0 1 0 0 1 0 1  |
| 100:  | 0 1 0 1 0 1 0 1  |
| 101:  | 0 1 1 0 1 0 1 1  |
| 110:  | 0 1 1 1 0 1 1 1  |
| 111:  | 0 1 1 1 1 1 1 1  |

*FIG. 11*

COLOR TUNABLE LIGHT SOURCE MODULE WITH BRIGHTNESS AND DIMMING CONTROL

CROSS-REFERENCE TO RELATED APPLICATIONS

This application claims the benefit of U.S. Provisional Application No. 61/808,603, filed Apr. 4, 2013, entitled "Color Tunable Light Source Module with Brightness Control," the disclosure of which is incorporated by reference herein in its entirety.

BACKGROUND

The present disclosure relates generally to light-emitting devices and in particular to a color-tunable light source module with brightness control.

Light sources based on light-emitting diodes (LEDs) are emerging as an energy-efficient replacement for conventional incandescent or halogen light sources in a variety of applications. Compared to conventional light sources, LED-based light sources can provide significantly higher energy efficiency and longer life.

However, a number of challenges must be addressed to provide practical LED-based light sources. For example, a given LED emits light in a narrow band of wavelengths, which creates challenges for the production of white light (which is generally a mixture of different wavelengths). Further, not all white light is created equal. The human eye is sensitive to the differences among white-light sources such as fluorescent light, incandescent light, and sunlight. These differences can be quantified in terms of well-known metrics such as color temperature (CCT) and/or color rendering index (CRI).

In addition, to provide sufficient light for many applications, high brightness and therefore high operating current is required. High current can lead to a buildup of heat, which can damage the LEDs. Accordingly, effective heat transfer and/or other techniques are significant in the design of high-performance LED-based light sources.

SUMMARY

Certain embodiments of the present invention relate to LED-based light source modules that incorporate color tunability and brightness control. In some embodiments, a user can independently select a desired color temperature and brightness and can change either or both dynamically. To allow dynamic changes in color temperature, the LED-based light source can include a single emitter substrate on which multiple LED dice (also referred to as LEDs) are disposed. The LEDs can be electrically connected into some number of independently addressable groups, with each group producing light of a different color or color temperature. For example, the LEDs can include three groups: one group that emits yellowish light (e.g., blue LEDs with a first quantity of yellow phosphor disposed on a light-emitting surface), one group that emits whitish light (e.g., blue LEDs with a second, smaller, quantity of yellow phosphor disposed on a light-emitting surface), and one group that emits red light (e.g., red LEDs). The groups of LEDs are independently addressable, meaning that the operating current supplied to each group can be independently controlled. By controlling the relative operating current provided to each group, a desired color temperature can be achieved, and by controlling the absolute operating currents, the brightness of the output light can be controlled.

In some embodiments, current control can be provided using a microcontroller that generates a train of digital pulses on a separate channel for each independently-addressable group of LEDs; each train can include a channel-specific number of pulses having a channel-specific pulse width. The pulses on a given channel can be integrated using an RC integrator circuit to provide a roughly constant input level to a current driver for the corresponding LED group; the input level for a given current driver can depend on the pulse width and/or number of pulses in the pulse train on the corresponding channel. Since LED brightness scales with current, this technique can provide independent brightness control for each group of LEDs in the emitter. It should be noted that the input level need not be constant, as long as any fluctuations are of sufficiently high frequency that they are not detectable to the human eye (e.g., above about 300 Hz). The control circuit can select a pulse width for each channel and a number of pulses to generate during a fixed-length "brightness cycle" based on the desired color temperature and/or brightness. In some embodiments, brightness and color temperature can be dynamically changed between brightness cycles in response to user input.

In some embodiments, a user can independently control color temperature and brightness, e.g., using physical or virtual sliders, knobs, control buttons, or other control devices. In some embodiments, color temperature can be correlated with brightness, e.g., to mimic the observable warming of the color temperature of a conventional halogen or incandescent light as it dims. Further, brightness changes can be smoothed and spread over time, e.g., to mimic the behavior of conventional light sources.

Certain aspects of the invention relate to light emitters. For example, a light emitter can have a substrate made of multiple layers of an electrically insulating and thermally conductive material with electrically conductive paths disposed between the layers. Light-emitting diodes (LEDs) can be disposed on a top surface of the substrate, including a group of red LEDs that produce red light, a group of whitish LEDs (e.g., blue LEDs having a first quantity of a yellow phosphor such as YAG disposed thereon) that produce whitish light, and a group of yellowish LEDs (e.g., blue LEDs having a second quantity of yellow phosphor disposed thereon) that produce yellowish light. The LEDs can be electrically connected using the electrically conductive paths of the substrate such that each group of LEDs is independently addressable; for instance, the LEDs within each group can be connected in series with each other while LEDs in different groups are not electrically connected with each other. The whitish and yellowish LEDs can be made without red phosphor and can differ from each other in the amount of yellow phosphor used, which determines the color of light. For instance, in some embodiments, the yellowish light corresponds to a region in CIE color space having CIE-x between about 0.42 and 0.45 and CIE-y between about 0.50 and 0.54, while the whitish light corresponds to a region in CIE color space having CIE-x between about 0.31 and 0.34 and CIE-y between about 0.34 and 0.37.

Certain aspects of the invention relate to light source modules that incorporate an emitter having multiple LEDs disposed on a single substrate and electrically connected into at least three independently addressable groups of LEDs, along with a microcontroller and other circuitry. The LEDs in each group can emit light of a different color, and the color of the output light can be controlled by supplying different operating currents to each group of LEDs. For example, the light source module can include at least three current regulators, each current regulator being coupled to provide an operating current to a different one of the independently addressable groups of LEDs in response to an adjustable input voltage and a constant reference voltage. A microcontroller can be configured to receive input settings specifying a color temperature and brightness setting and to generate a pulse train on each of a plurality of output channels, each pulse train including a selectable number of pulses having a selectable pulse width; the microcontroller can also select the number of pulses and the pulse width for each output channel based on the input settings. To convert the pulse train to a control voltage for the current regulators, an RC integrator circuit can be coupled between each of the output channels of the microcontroller and each of the current regulators.

The pulse trains can be defined as desired. For example, a pulse train can have a duration defined as a fixed number of pulse periods, and the duration of the pulse train can be the same on all of the output channels. For each pulse period of the pulse train, a pulse can be either generated or not, depending on the selected number of pulses. In some embodiments, if the selected number of pulses for a particular pulse train is less than the number of pulse periods in the pulse train, a pulse is generated for each pulse period up to the selected number and no pulse is generated for subsequent pulse periods for the duration of the pulse train; other distributions of pulses within the duration of a pulse train can also be used. In some embodiments, the selected number of pulses for a given output channel can be dithered between two adjacent values for different pulse trains, providing a further fine-tuning of the brightness control on each channel, which can allow for a finer granularity of color mixing for a given hardware configuration.

Certain aspects of the invention relate to methods of controlling brightness and color temperature in a light source device having multiple independently addressable groups of LEDs, where the LEDs in each group emit light of a different color. A target color temperature and brightness set-point can be determined based at least in part on a received control signal. For each of a number of output channels (which can be equal to the number of independently addressable groups of LEDs), a microcontroller or other microprocessor can independently compute a pulse width and a number of pulses to include in a pulse train; the computation can be based at least in part on the target color temperature and brightness set-point. A pulse train can be generated for each output channel; the pulse train for a given channel can include the number of pulses computed for that output channel, with each pulse having the pulse width computed for that output channel. Each pulse train can be separately converted to an operating current. For example, each of the pulse trains can be propagated through a different RC integrator circuit to produce an output voltage, and the output voltage from each RC integrator circuit can be provided as an adjustable voltage input to a different current regulator; each current regulator can generate an output current dependent on the adjustable voltage input it receives. Each of the operating currents can be delivered to a different one of the independently addressable groups of LEDs.

Various algorithms can be used to compute the pulse width and number of pulses for a given output channel. For example, in some embodiments, a microcontroller can access a lookup table using the target color temperature to determine a baseline pulse width parameter and can determine the number of pulses to be sent as a fraction of the fixed number of pulse periods in the pulse train, the fraction being based on the brightness set-point. In other embodiments, the microcontroller can use interpolation to provide more fine-grained control. For example, the microprocessor can access a lookup table using the target color temperature to determine first and second baseline pulse width parameters (e.g., for color temperatures above and below the target) and interpolate between the first and second baseline pulse width parameters to generate a width value. Pulse width can be determined based at least in part on the most significant bits of the width value, and the number of pulses in a pulse train can be determined based at least in part on the brightness set point and the least significant bits of the width value. In some embodiments, determining the number of pulses can include computing a count value based on the brightness set point and the least significant bits of the width value, the count value consisting of a first subset of most significant bits and a second subset of least significant bits; determining a basic number of pulses corresponding to the most significant bits of the count value; determining a dither mask based on the least significant bits of the count value; and for a given pulse train in a sequence of pulse trains, selecting either the basic number of pulses or a number that differs by one from the basic number of pulses, the selection being based at least in part on the dither mask.

Certain aspects of the invention relate to methods of dynamically controlling brightness and color temperature in a light source device having multiple independently addressable groups of LEDs, where the LEDs in each group emit light of a different color. A received control signal can indicate that a brightness of the light source should be changed from a starting brightness value to a target brightness value. Based on the control signal, a brightness trajectory from the current brightness value to the target brightness value can be defined; the brightness trajectory can consist of a sequence of frames, each frame having a different brightness value assigned thereto and a duration that is long enough to be perceptible to a human eye. The brightness trajectory can be executed to create a smooth transition from the current brightness value to the target brightness value. In some embodiments, the brightness trajectory is executed frame-by-frame. For each frame, a brightness set-point can be determined from the brightness trajectory. Pulse widths and number of pulses for a pulse train can be computed, and a pulse train for each output channel can be generated, converted to an operating current, and delivered to the independently addressable groups of LEDs. Pulse trains can be repeatedly generated, converted and delivered for the duration of the frame.

In some embodiments, after each repetition of generating the pulse train, the microcontroller can determine whether the target brightness value has changed. If so, a new brightness trajectory can be defined based on the current brightness value and the changed target brightness value, and the new brightness trajectory can be executed in place of the old.

In some embodiments, color temperature can be adjusted along with brightness during execution of a brightness trajectory. For instance, defining the brightness trajectory can include selecting a color temperature for each frame based at least in part on the brightness value assigned to each frame, e.g., such that color temperature decreases with decreasing brightness; this can model the dimming behavior of a halogen light source or other conventional light source.

The following detailed description together with the accompanying drawings will provide a better understanding of the nature and advantages of the present invention.

BRIEF DESCRIPTION OF THE DRAWINGS

FIG. 11 illustrates a set of dither masks that can be defined to facilitate dithering according to an embodiment of the present invention.

DETAILED DESCRIPTION

Figure 1:
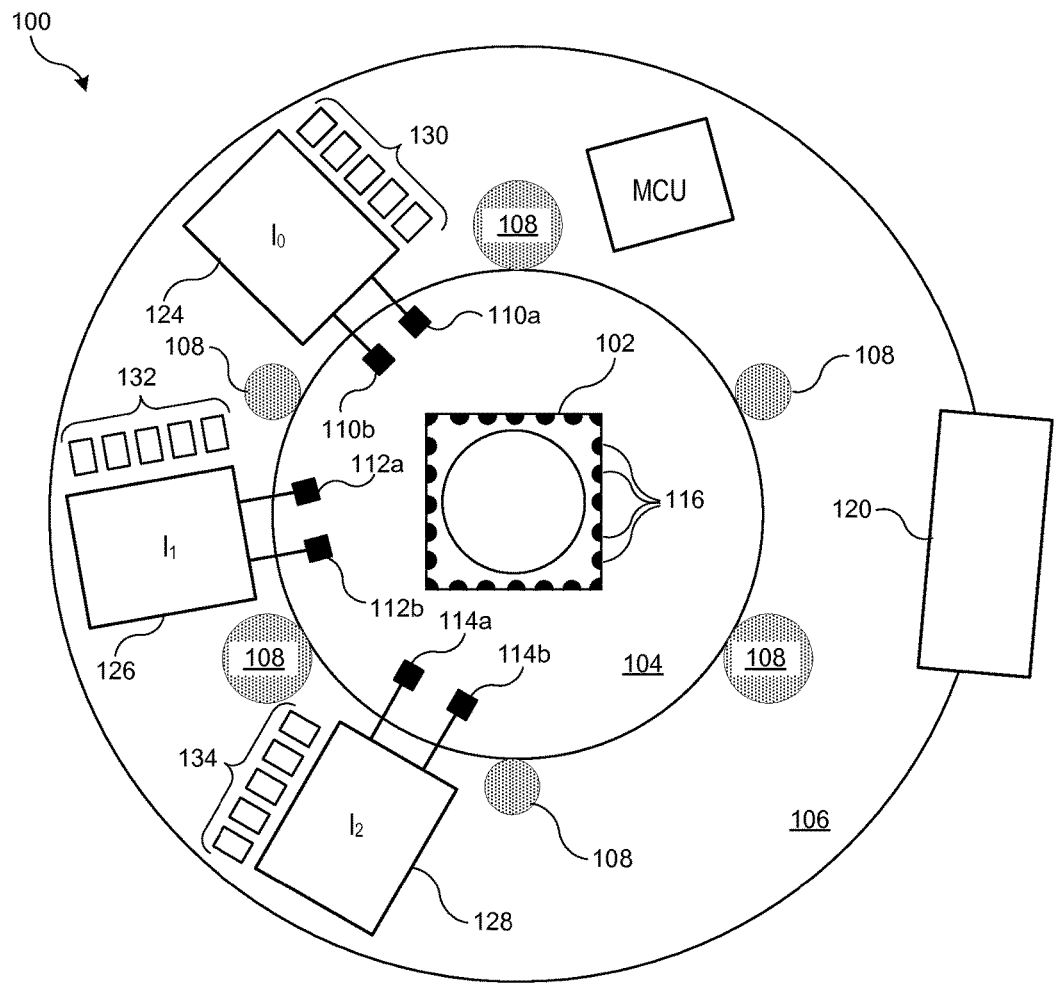
FIG. 1 is a simplified top view of an LED-based light source module according to an embodiment of the present invention.

Certain embodiments of the present invention relate to LED-based light source modules that incorporate color tunability and brightness control. In some embodiments, a user can independently select a desired color temperature and brightness and can change either or both dynamically. To allow dynamic changes in color temperature, the LED-based light source can include a single emitter substrate on which multiple LED dice (also referred to as LEDs) are disposed. The LEDs can be electrically connected into some number of independently addressable groups, with each group producing light of a different color or color temperature. For example, the LEDs can include three groups: one group that emits yellowish light (e.g., blue LEDs with a first quantity of yellow phosphor disposed on a light-emitting surface), one group that emits whitish light (e.g., blue LEDs with a second, smaller, quantity of yellow phosphor disposed on a light-emitting surface), and one group that emits red light (e.g., red LEDs). The groups of LEDs are independently addressable, meaning that the operating current supplied to each group can be independently controlled. By controlling the relative operating current provided to each group, a desired color temperature can be achieved, and by controlling the absolute operating currents, the brightness of the output light can be controlled.

In some embodiments, current control can be provided using a microcontroller that generates a train of digital pulses on a separate channel for each independently-addressable group of LEDs; each train can include a channel-specific number of pulses having a channel-specific pulse width. The pulses on a given channel can be integrated using an RC integrator circuit to provide a roughly constant input level to a current driver for the corresponding LED group; the input level for a given current driver can depend on the pulse width and/or number of pulses in the pulse train on the corresponding channel. Since LED brightness scales with current, this technique can provide independent brightness control for each group of LEDs in the emitter. It should be noted that the input level need not be constant, as long as any fluctuations are of sufficiently high frequency that they are not detectable to the human eye (e.g., above about 300 Hz). The control circuit can select a pulse width for each channel and a number of pulses to generate during a fixed-length "brightness cycle" based on the desired color temperature and/or brightness. In some embodiments, brightness and color temperature can be dynamically changed between brightness cycles in response to user input.

In some embodiments, a user can independently control color temperature and brightness, e.g., using physical or virtual sliders, knobs, control buttons, or other control devices. In some embodiments, color temperature can be correlated with brightness, e.g., to mimic the observable warming of the color temperature of a conventional halogen or incandescent light as it dims. Further, brightness changes can be smoothed and spread over time, e.g., to mimic the behavior of conventional light sources.

FIG. 1 is a simplified top view of an LED-based light source module 100 according to an embodiment of the present invention. Light source module 100 includes an emitter 102 that includes multiple independently addressable groups of LEDs, with each group producing light of a different color. Specific examples of LED configurations for emitter 102 are described below.

Emitter 102 is mounted on a central printed circuit board (PCB) 104 that can be physically connected to a peripheral PCB 106. In some embodiments, peripheral PCB 106 can be a separate circuit board that is attached at a mezzanine level above central PCB 104, providing thermal isolation between central PCB 104 and peripheral PCB 106. Alignment holes 108 can be provided through peripheral PCB 106 (and central PCB 104 to the extent that central PCB 104 extends laterally beneath peripheral PCB 106) to facilitate placement of light-source module 100 into a lamp or other light fixture as well as alignment of secondary optics (e.g., a total internal reflection lens or the like), supporting structures, heat sink, etc. Other alignment features can also be provided.

Central PCB 104 can incorporate a metal-core PCB or other structure with high thermal conductivity that can spread and transfer heat generated by emitter 102 during device operation to help maintain the LEDs in emitter 102 at a desired operating temperature. Central PCB 104 can provide electrical connectivity to emitter module 102 via contact pads 110, 112, 114 that connect to traces (not shown) within the body of central PCB 104. These traces in turn can be electrically connected to peripheral contacts 116 of emitter 102.

Peripheral PCB 106 can be a metal-core or other type of PCB and can be thermally isolated from central PCB 104. Peripheral PCB 106 can provide mountings for various components including a connector 120; a microcontroller unit (MCU) 122; current regulators 124, 126, 128; and RC circuit components 130, 132, 134, which can include, e.g., various resistors and capacitors as described below. Additional components, such as additional resistors, capacitors, fuses, power conditioning and/or power distribution components, and so on can also be mounted on peripheral PCB 106. The various components can be connected by traces (not shown) on the surface of and/or internal to peripheral PCB 106 to form appropriate control circuits. Specific examples of control circuits that can be implemented using components mounted on peripheral PCB 106 and traces connecting them are described below.

Connector 120 can be a receptacle-type connector that includes power and ground contacts. Power can be supplied as a constant DC voltage of, e.g., 10 volts. Connector 120 can also provide contacts for analog or digital control signals, e.g., signals indicating a desired brightness level and/or color temperature. These signals can conform to known protocols such as $I^2C$ or other protocols as desired. In some embodiments, connector 120 conforms to a conventional form factor and pin arrangement to facilitate retrofitting of existing light fixtures.

MCU 122 can be a microprocessor, such as a microcontroller, of generally conventional design. In some embodiments, MCU 122 can include a programmable processing core that can execute program-code instructions, which can be stored in onboard memory (e.g., read-only memory, or ROM) of MCU 122 or an external memory. MCU 122 can also be implemented using customized circuits, such as application specific integrated circuits (ASICs), field programmable gate arrays (FPGAs), or the like. In some embodiments, such integrated circuits execute instructions that are stored on the circuit itself. In some embodiments, MCU 122 can be implemented using a single off-the-shelf microcontroller device. Alternatively, a custom device or multiple devices can be used to implement control operations described herein or similar operations.

In operation, MCU 122 can be configured to receive control signals (e.g., signals indicating a desired color and/or brightness of the output light) via connector 120 and determine a desired operating current for each of the independently addressable groups of LEDs in emitter 102. In some embodiments, as described below, MCU 122 includes an independent pulse-width modulation (PWM) output channel for each independently addressable group of LEDs. MCU 122 can determine the appropriate pulse duration and number and/or frequency of pulses to be generated for each channel based on desired characteristics of the output light as specified by the control signals received via connector 120. Examples of control algorithms that can be implemented in MCU 122 are described below.

RC circuit components 130, 132, 134 can include resistors and capacitors that are interconnected to provide a separate RC integrating circuit for each PWM output channel. As described below, the RC integrating circuits can "smooth" the PWM signal on each output into a roughly constant voltage level.

Current regulators 124, 126, 128 can each be integrated circuits or other electronic devices that generate a current in response to an adjustable control voltage provided by the corresponding RC circuit 130, 132, 134. Conventional current regulators can be used. The generated current from each current regulator 124, 126, 128 flows between output terminals connected to respective pads 110, 112, 114 on central PCB 104, thereby providing three independently controlled operating currents to emitter 102. Thus, for example, via traces on central PCB 104, pads 110a and 110b can be connected to a first group of LEDs within emitter 102, pads 112a and 112b to a second group of LEDs within emitter 102, and pads 114a and 114b to a third group of LEDs within emitter 102. While three current regulators and RC circuits are shown, it is to be understood that more or fewer could be used, depending on the number of independently addressable groups of LEDs in emitter 102.

Figure 2A:
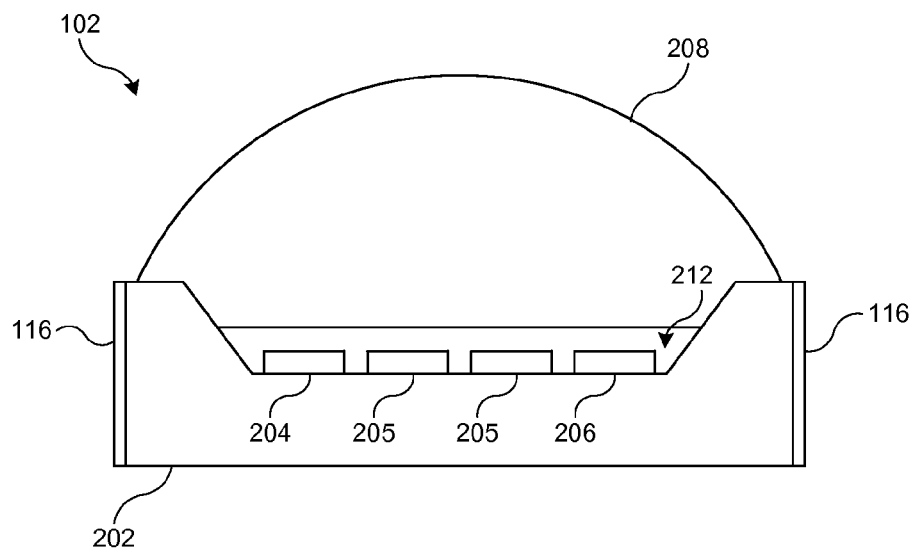
FIG. 2A is a simplified cross-sectional side view of an emitter for a light-source module according to an embodiment of the present invention.
Figure 2B:
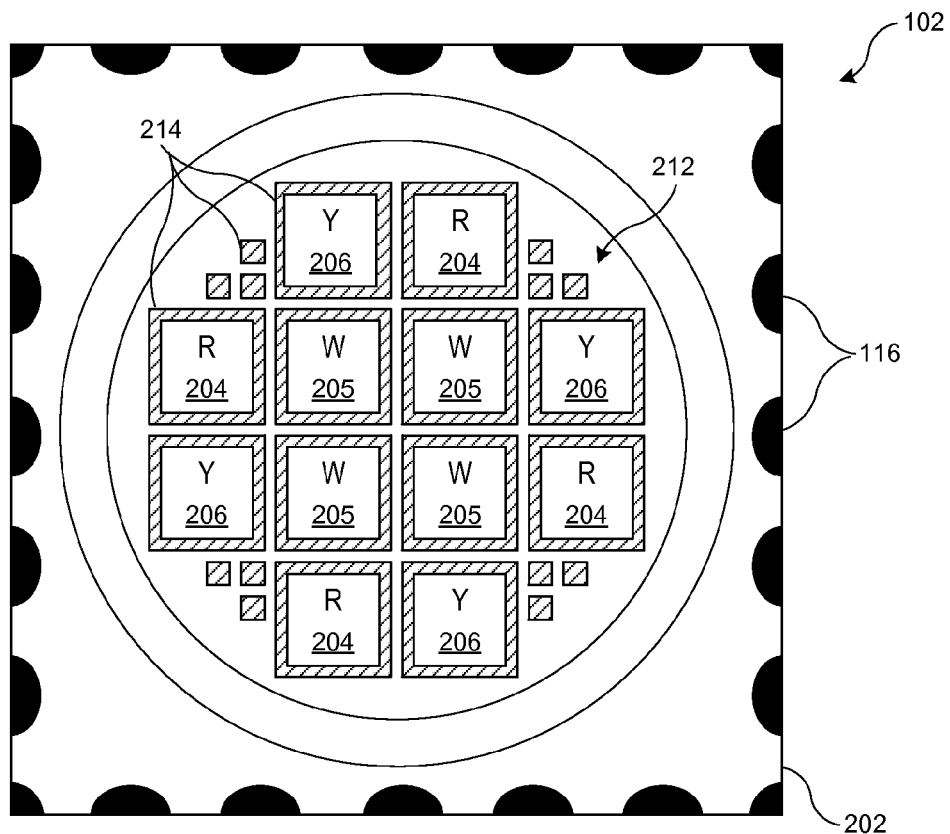
FIG. 2B is a simplified top view of an emitter for a light-source module according to an embodiment of the present invention.

In the embodiment of FIG. 1, emitter 102 provides three independently-addressable groups of LEDs. FIG. 2A is a simplified cross-sectional side view of emitter 102 according to an embodiment of the present invention, and FIG. 2B is a simplified top view of emitter 102 according to an embodiment of the present invention.

Emitter 102 can include a ceramic substrate 202; LEDs 204, 205, 206; and a primary lens 208. LEDs 204, 205, 206 can be light-emitting diodes that generate light of a particular frequency. Any type, color, or combination of LEDs can be used. In some embodiments, three different types of LEDs 204, 205, 206 are used. LEDs 204 can be conventional red LEDs (labeled "R" in FIG. 2B) that emit light with a peak wavelength in the red region of the electromagnetic spectrum (e.g., between about 620 and 645 nm). LEDs 205 can be "whitish" LEDs (labeled "W" in FIG. 2B) that emit a cool whitish light (color temperature around 5300 K). LEDs 206 can be "yellowish" LEDs (labeled "Y" in FIG. 2B) that emit a yellowish or warm whitish light. In some embodiments, whitish LEDs 205 and yellowish LEDs 206 are formed from conventional blue LEDs (e.g., with peak wavelength between about 460 and 490 nm) coated with different amounts of the same yellow phosphor material (e.g., a conventional YAG phosphor with an emission peak wavelength between about 540 and 565 nm). As described below, neither the whitish nor yellowish LEDs are required to produce light along the blackbody locus. Instead, blackbody-like white light can be produced by mixing light from the three groups.

Substrate 202 can be a single-layer or multi-layer ceramic substrate. In some embodiments, substrate 202 is formed from multiple layers of a ceramic material (e.g., alumina) that are patterned with metal traces (not shown), then fused together. Vias can be formed to connect metal traces at different layers. The metal traces can provide electrical connections from LEDs 204, 205, 206 to peripheral contact pads 116. In some embodiments, the metal traces are arranged to provide separate electrical connections to different ones of LEDs 204, 205 206, thereby allowing separate control of different LEDs or groups of LEDs, e.g., to adjust the color of emitted light. Accordingly, red, whitish, and yellowish LEDs 204, 205, 206 shown in FIG. 2B can each be electrically coupled to a different one of current regulators 124, 126, 128 of FIG. 1.

In some embodiments, LEDs 204, 205, 206 are disposed within a circular recess region 212 on the top side of substrate 202. As shown in FIG. 2B, the top surface of substrate 202 within recess region 212 can be patterned with metal contact pads 214 to provide electrical connections to LEDs 204, 205, 206. In some embodiments, LEDs 204, 205, 206 can have wire-bonding contacts (not shown) on the top surface and can be electrically connected to the contact pads 214 by wire bonding. In some embodiments, one or more electrical contacts for an LED 204, 205, 206 may be on the bottom surface of LED 204, 205, 206, allowing LED 204, 205, 206 to be electrically connected to the contact pad 214 on which it is placed. The number and arrangement of metal contact pads 214 and LEDs 204, 205, 206 can be varied as desired.

In some embodiments, substrate 202 can be similar to substrates described in U.S. Patent Application Publication No. 2010/0259930. Other types of substrates can also be used. The dimensions of substrate 202 can be varied as desired, e.g., depending in part on the number and arrangement of LEDs 204, 205, 206. For example, substrate 202 can be square with dimensions of 0.7-5.0 cm on a side (e.g., 0.9 cm in one embodiment) and a thickness of 0.5-2.0 mm (e.g., 1.0 mm in one embodiment).

Primary lens 208 can be used to focus or direct light generated by LEDs 204, 205, 206. In some embodiments, the lower portion of lens 208 is shaped to fit into and partially fill recess region 212 as shown in FIG. 2A. The remainder of recess region 212 can be filled with air or with an optically transparent material, e.g., approximately matching an index of refraction of lens 208. In some embodiments, one or more secondary lenses (not shown), such as a total internal reflection lens, can be used to further shape the light output from emitter 102.

Figure 3:
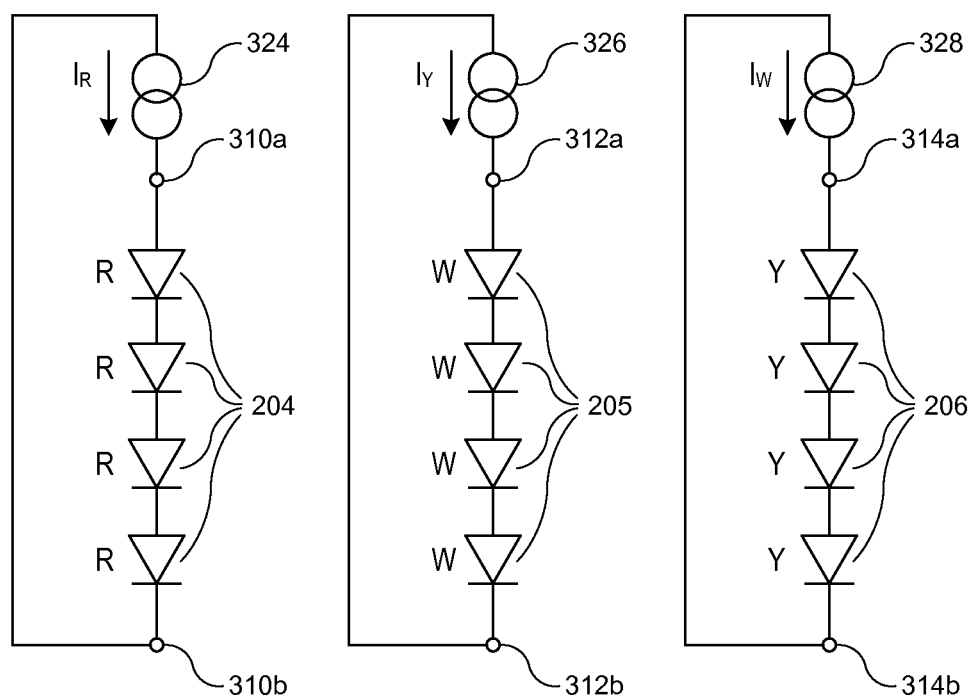
FIG. 3 is a simplified circuit diagram showing electrical connections for LEDs in an emitter according to an embodiment of the present invention.

FIG. 3 is a simplified circuit diagram showing electrical connections for LEDs 204, 205, 206 according to an embodiment of the present invention. As shown, red LEDs 204 can be connected to current source 324 (corresponding to current source 124 of FIG. 1); nodes 310a, 310b can correspond to pads 110a, 110b of FIG. 1. Whitish LEDs 205 can be connected to current source 326 (corresponding to current source 126 of FIG. 1); nodes 312a, 312b can correspond to pads 112a, 112b of FIG. 1. Yellowish LEDs 206 can be connected to current source 328 (corresponding to current source 126 of FIG. 1); nodes 314a, 314b can correspond to pads 114a, 114b of FIG. 1. As described above, these connections can be implemented using metal contact pads 214 connected to metal traces between the layers of ceramic substrate 202 of FIGS. 2A and 2B to establish electrical paths between different groups of LEDs and different ones of peripheral contacts 116. Peripheral contacts 116 can be connected to pads 112a, 112b, 114a, 114b, 116a, 116b via traces in central PCB 104 of FIG. 1.

Figure 4:
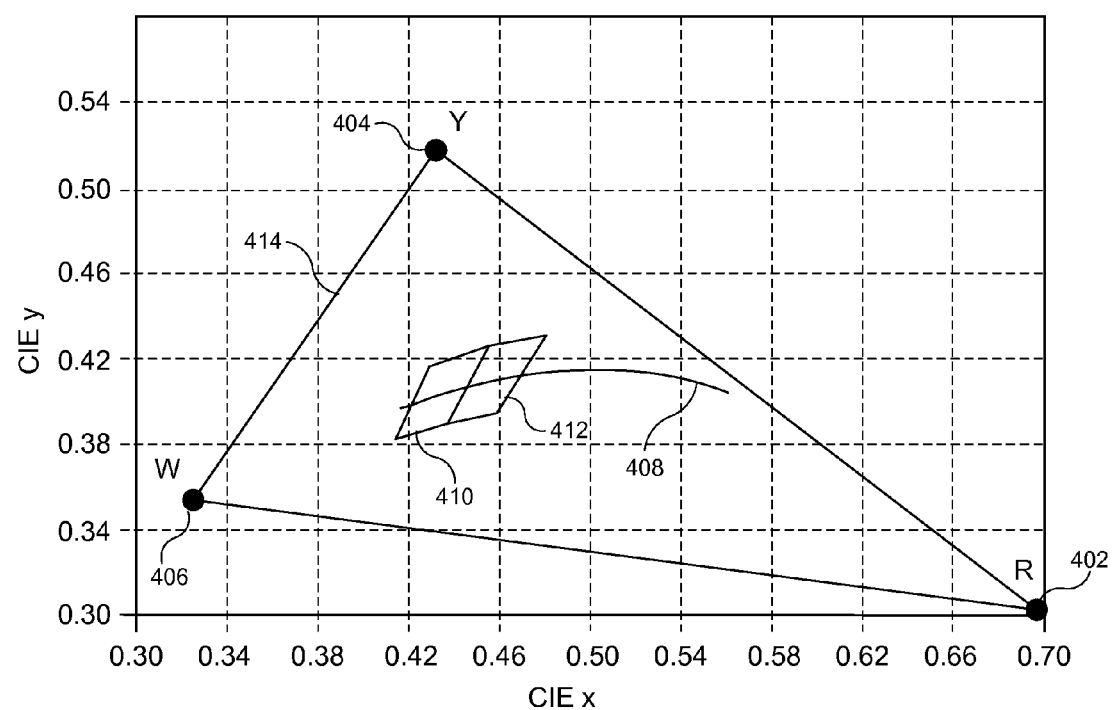
FIG. 4 is a graph of a portion of CIE color space illustrating color tuning according to an embodiment of the present invention.

The color properties of light emitted by emitter 102 can be controlled by adjusting the relative current supplied to each group of LEDs. FIG. 4 is a graph of a portion of CIE color space illustrating color tuning according to an embodiment of the present invention. Point 402 corresponds to an aggregate color emitted by red LEDs 204 of FIG. 2; point 404 to an aggregate color emitted by whitish LEDs 205; and point 406 to an aggregate color emitted by yellowish LEDs 206. It is to be understood that points 402, 404 and 406 are indicative of the aggregate color produced by all the LEDs of a group, which need not correspond to the color produced by any one LED in the group. Also shown for reference is a portion of the blackbody locus 408 (also referred to as the Planckian locus), along which light appears as white to the human eye. Color temperature (also referred to as "CCT") varies along blackbody locus 408 from warmer (lower temperatures) toward the right to cooler (higher temperatures) toward the left. Also shown are representative ANSI color bins 410, 412 corresponding to some of the industry-accepted white light standards.

As shown, all of LEDs 204, 205, 206 can produce light outside ANSI color bins 410, 412. However, the combined light output the three groups of LEDs can be tuned to any color within triangle 414 by adjusting the relative currents supplied to—and consequently the relative brightness of—the three LED groups. Accordingly, the light can be tuned to either of ANSI color bins 410, 412 or to other ANSI color bins (not shown) or to other points along blackbody locus 408. Accordingly, light having a dynamically tunable white color can be provided.

As described above, whitish LEDs and yellowish LEDs can be made from the same type of blue LEDs, and LEDs in the two groups can differ in the amount of yellow phosphor disposed on the light-emitting surfaces. Using a single type of phosphor can allow for higher efficiency (in lumens per watt) as compared to devices that use blue LEDs coated with both yellow and red phosphor, in part because only a single phosphor is used (which can be a high-efficiency phosphor such as YAG) and in part because no attempt is made to tune the light output of either group to the blackbody locus. Red LEDs can provide inherently high efficiency. Consequently, efficiency (e.g., in lumens per watt) for a light source module using these three groups can be around 50% higher than for conventional white LED designs. In addition, the color mixing can provide improvements in color rendering index ("CRI"); in some embodiments, CRI of approximately 90 and R9 (a component of CRI corresponding to saturated red) of 70 or higher can be achieved, as compared to CRI of approximately 80 and R9 of less than 30 for some conventional LED-based light sources. Higher CRI indicates that the resulting light will tend to be more natural-looking.

Tuning to a desired color or CCT within triangle 414 can be achieved by controlling the relative operating currents supplied to the different LED groups. In some embodiments, an automated system can be used to determine the ratio of currents required to obtain a particular desired color temperature, and a color-mixing lookup table can be constructed that specifies the current ratios to be used for a given color temperature. In a manufacturing environment where the color of light produced by a given LED group is reliably consistent from one device to the next, the same lookup table can be applied to all devices manufactured in that environment. Where the color of light is more variable, an automated process and system can be used to determine a lookup table for each emitter, e.g., as part of an emitter manufacturing process. Examples of suitable processes and systems are described in U.S. Patent App. Pub. No. 2012/0286699; other processes and systems can also be used.

Figure 5:
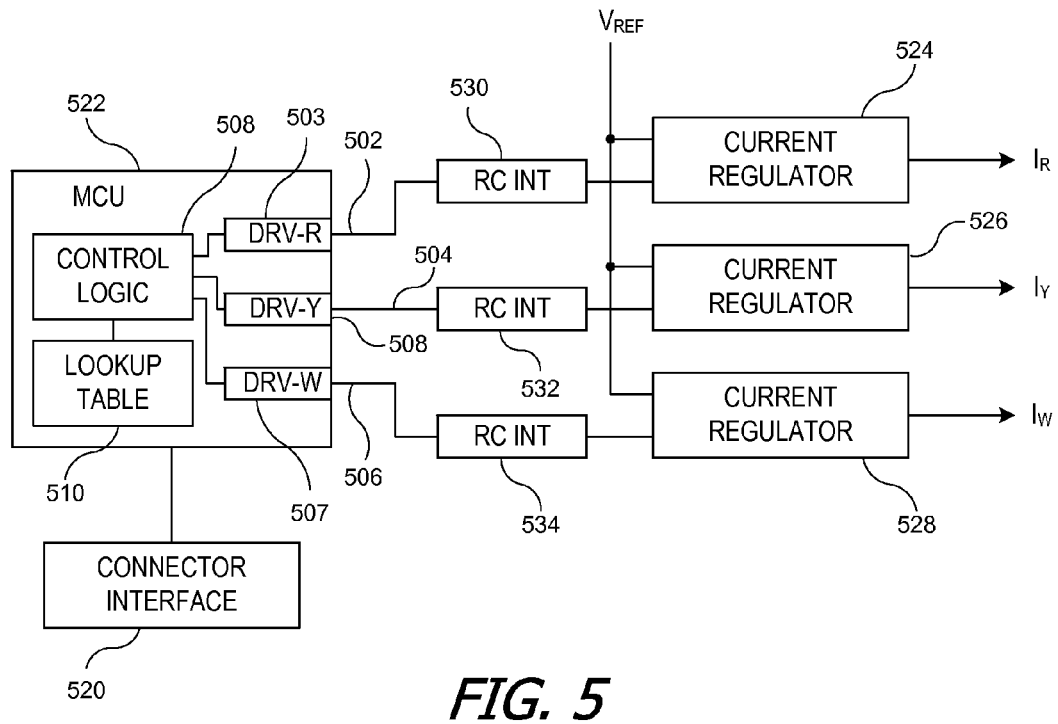
FIG. 5 is a simplified block diagram of current generation circuitry that can be implemented in a light-source module according to an embodiment of the present invention.

In some embodiments, MCU 122 of FIG. 1 can be programmed to use a color-mixing lookup table to determine PWM pulse parameters for each channel, which in turn can be used to generate the operating currents. FIG. 5 is a simplified block diagram of current generation circuitry that can be implemented in light-source module 100 of FIG. 1 according to an embodiment of the present invention.

As shown in FIG. 5, MCU 522 (which can correspond to MCU 122 of FIG. 1) can provide three PWM output signals on paths 502, 504, 506. Control logic 508 within MCU 522 can configure a PWM driver 503, 505, 507 for each PWM output signal path 502, 504, 506 to generate square-wave pulses of controlled pulse width. In some embodiments, control logic 508 can be responsive to color temperature and/or brightness inputs received via connector interface 520, which can incorporate connector 120 of FIG. 1, as well as to a color-mixing lookup table 510, which can be populated as described above with reference to FIG. 4. Examples of specific algorithms that can be implemented in control logic 508 are described below.

Each PWM driver 503, 505, 507 can deliver pulses via one of paths 502, 504, 506 to a corresponding RC integrator circuit 530, 532, 534. These circuits can incorporate components 130, 132, 134 of FIG. 1.

Figure 6:
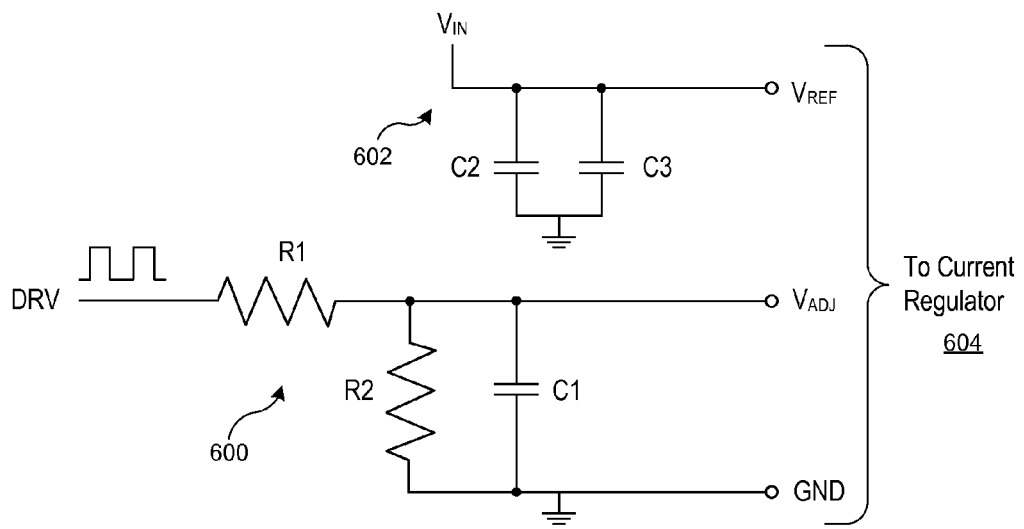
FIG. 6 illustrates an RC integrator circuit that can be used according to an embodiment of the present invention.

FIG. 6 illustrates a representative RC integrator circuit 600 that can correspond to any one of circuits 530, 532, 534 of FIG. 5. Circuit 600 uses resistors R1, R2 and capacitor C1 to generate a voltage $V_{ADJ}$ in response to an input signal DRV (which can correspond to any one of PWM output signals 502, 504, 506 of FIG. 5. $V_{ADJ}$ is provided as the control input to current regulator 604 (e.g., any one of current regulators 524, 526, 528 of FIG. 5), along with a constant reference voltage $V_{REF}$ (e.g., 10 volts or 24 volts) that can be generated by circuit 602 from an external input voltage, which can be provided, e.g., via connector 120 of FIG. 1. Values of resistors and capacitors can be selected as desired for a particular implementation. In one embodiment, R1 can be 2.4 kΩ, R2 can be 2.7 kΩ, C1 can be 0.033 µF, C2 can be 0.1 µF, and C3 can be 0.1 µF. Other values can be substituted.

Those skilled in the art will recognize that RC circuit 600 can operate to time-integrate the square-wave input signal such that the output signal $V_{ADJ}$ is roughly constant. As described below, $V_{ADJ}$ can fluctuate over time, as long as the resulting current fluctuations are sufficiently high in frequency to be imperceptible to a human observer (as a result of time-integration characteristics inherent to human vision).

As shown in FIGS. 5 and 6, RC integrator circuits 530, 532, 534 can each provide an output signal $V_{ADJ}$ as a control input to a current regulator 524, 526, 528, which can correspond to current regulators 124, 126, 128. Conventional current-regulator circuits can be used. In operation, current regulators 524, 526, 528 generate an output current between zero and an upper limit (e.g., 1 A in some embodiments) in proportion to $V_{ADJ}$. For example, the current can vary between zero and the upper limit linearly as $V_{ADJ}$ varies between ground voltage and the reference voltage $V_{REF}$. In some embodiments, a lower limit may be imposed on $V_{ADJ}$ such the output current is zero if $V_{ADJ}$ is below the minimum (e.g., $V_{ADJ} < 0.1 * V_{REF}$). The output currents $I_R$, $I_W$, $I_Y$ can be provided to the LED groups of emitter 102 as shown in FIG. 3.

Figure 7:
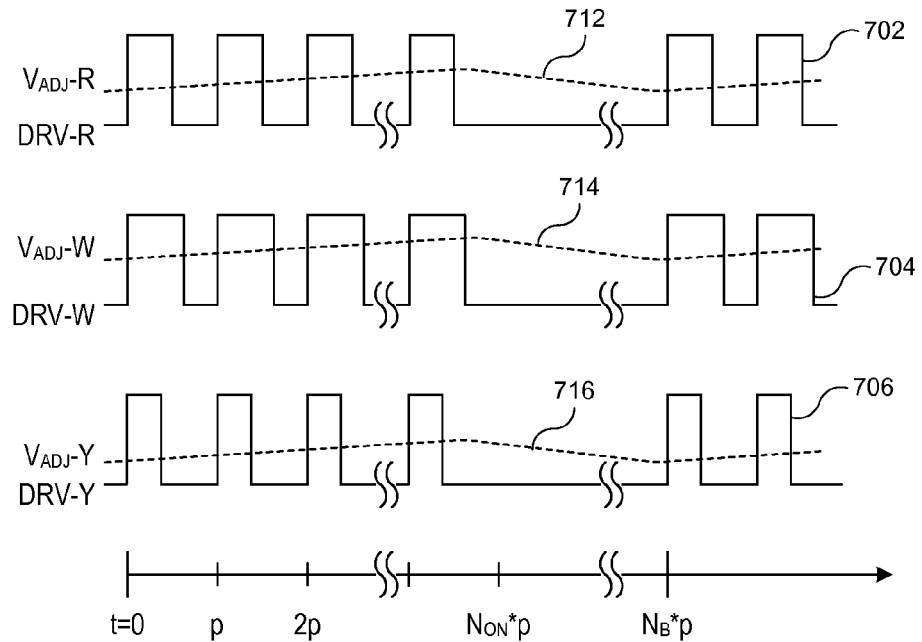
FIG. 7 illustrates controlling brightness using pulse width according to an embodiment of the present invention.
Figure 8:
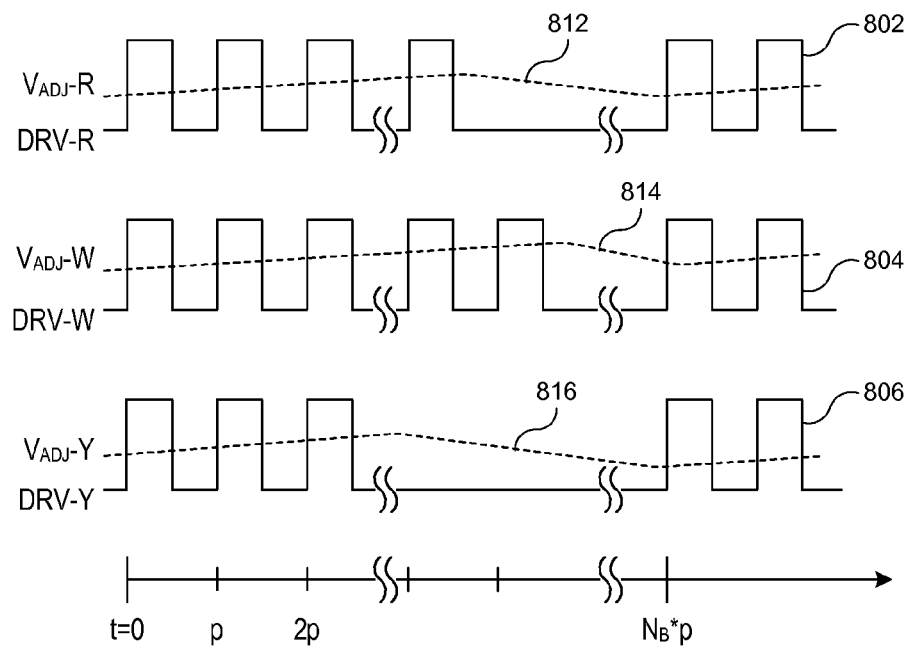
FIG. 8 illustrates controlling brightness using a number of pulses in a pulse train according to an embodiment of the present invention.

In various embodiments, MCU 522 can control the brightness of each LED group (and the overall brightness of the light) by adjusting the characteristics of pulses produced at PWM driver outputs 502, 504, 506. FIGS. 7 and 8 illustrate examples of controlling brightness using PWM pulse characteristics according to embodiments of the present invention.

In FIG. 7, MCU 522 generates pulses on each channel with the same period (p). Pulse period p can be defined in terms of the CPU clock of MCU 522. For example p can be 200 or 256 or some other number of CPU clock cycles. If the CPU clock operates at 8 MHz, then p would be 25 microseconds or 32 microseconds or some other number. (It is to be understood that all numbers used herein are illustrative.) However, the pulses on different channels have different widths; in this example, DRV-W pulses (line 704) are wider than DRV-R pulses (line 702), and DRV-R pulses are wider than DRV-Y pulses (line 706). Accordingly, the RC integrator circuits produce different voltage levels, as indicated by dashed lines 712, 714, 716. Adjusting the relative pulse widths across the channels can result in changing the color mix and therefore the color temperature.

In this example, overall brightness can be controlled by generating a particular number of pulses in a "pulse train" consisting of a number $N_B$ of pulse periods p. The duration of a pulse train ($N_B * p$) is also referred to herein as a "brightness cycle." In one embodiment, $N_B = 128$; if the pulse period is 32 microseconds, the brightness cycle has a duration of about 4.1 milliseconds. Within the brightness cycle, as shown in FIG. 7, the first $N_{ON}$ pulses are generated, while the remaining $N_B - N_{ON}$ pulses are suppressed (not generated). $N_{ON}$ can be determined based on the desired brightness and can range, e.g., from 0 to $N_B - 1$. Multiple brightness cycles can be executed successively to produce steady-state or time-varying operation of the light source module, and operation can continue as long as desired.

As shown in FIG. 7, the brightness cycle can produce a cyclic fluctuation in the output voltage levels of the RC integrator circuits (dashed lines 712, 714, 716). This can produce corresponding fluctuations in the operating current, which in turn can produce a flickering of the LED brightness. For the parameters given above, the flickering has a frequency that is high enough to be undetectable to the human eye (e.g., 244 Hz for p=32 µs, 312 Hz for p=25 µs).

FIG. 8 illustrates another technique for controlling the brightness of each LED group. In this example, DRV-R pulses (line 802), DRV-W pulses (line 804), and DRV-Y pulses (line 806) all have the same width. However, a different number of pulses is sent on each channel during a brightness cycle: the pulse train for DRV-R (line 802) has one more pulse than that for DRV-Y (line 806), and the pulse train for DRV-W (line 804) has one more pulse than that for DRV-R. Accordingly, the RC integrator circuits produce different voltage levels, as indicated by dashed lines 812, 814, 816. Thus, as with adjusting relative pulse widths, adjusting the relative number of pulses sent on different channels can also result in changing the color mix and therefore the color temperature. Adjusting the number of pulses in the pulse trains on all channels by the same amount can increase or decrease the brightness without affecting color temperature.

It will be appreciated that the light source module described herein is illustrative and that variations and modifications are possible. An emitter can have any number of independently addressable LED groups. For example, one alternative emitter configuration can include four groups of LEDs, e.g., the three groups shown in FIG. 4 plus a "green" group that can have CIE color-space coordinates CIE-x between about 0.31 and 0.34 and CIE-Y between about 0.48 and 0.52. Another configuration has four groups including red, green, blue and yellowish LEDs.

For emitter configurations with three groups, the ratio of operating currents that tunes to a desired location in CIE color space is unique. In a four-group case, there can be infinitely many solutions for tuning to a desired location. Selection among the solutions can be facilitated using other criteria, such as maximizing CRI or a particular component of CRI (e.g., R9), and a lookup table representing the selected solution for each of a set of CCT values can be constructed.

The control circuits described above are also illustrative can be varied as desired. As long as the operating current supplied to each LED group is independently controllable, color mixing and brightness control can be achieved by adjusting the relative currents supplied to different LED groups. Components and component layouts are also provided for purposes of illustration and can be modified as desired. A variety of different control circuits can be used to independently control the operating current supplied to different groups of LEDs.

As shown in FIGS. 7 and 8, MCU 522 (or MCU 122) can control the pulse width of each pulse and/or the number of pulses sent on each channel during a brightness cycle in order to control the operating current supplied to each group of LEDs. MCU 522 can be programmed (or hard-wired) to determine pulse parameters (pulse width and number of pulses) for a pulse train based on input signals indicating a target color temperature (CCT) and/or brightness. Examples of specific algorithms for determining pulse parameters will now be described.

Figure 9:
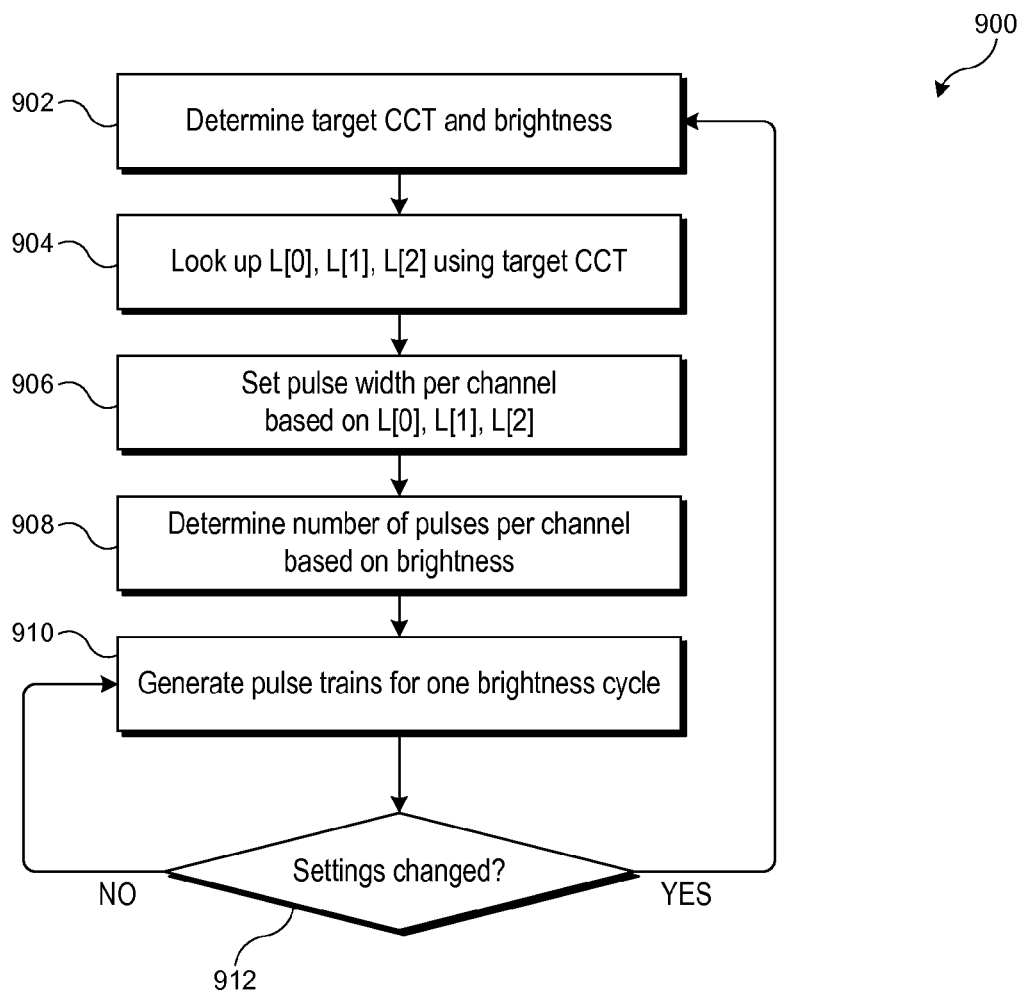
FIG. 9 is a flow diagram of a process for controlling pulse generation according to an embodiment of the present invention.

FIG. 9 is a flow diagram of a process 900 for controlling pulse generation that can be implemented, e.g., in control logic 508 of MCU 522 (or MCU 122), according to an embodiment of the present invention. Process 900 can be executed, e.g., as a continuous control loop for as long as light source 100 is powered.

At block 902, process 900 can determine a target CCT and brightness. For example, as described above, connector 120 of FIG. 1 can be connected to user-operable controls that the user can adjust to a desired color temperature and brightness. These controls can include dials, sliders, keypads (e.g., with arrow keys to indicate an adjustment direction), and so on. In some embodiments, the user-operable controls can be part of a computer-generated graphical user interface, and the computer can communicate appropriate control signals to connector 120. Connector 120 can provide to MCU 122 signals indicating the target CCT and/or brightness based on a current setting of the user-operable controls. In some embodiments, connector 120 can provide "raw" input signals indicating actual control settings, and MCU 122 can interpret the settings to determine target CCT and brightness.

At block 904, MCU 122 can use the target CCT to look up a baseline pulse width parameter for each channel (denoted L[0], L[1], L[2]), e.g., using lookup table 510. For example, MCU 122 can identify the nearest CCT to the target CCT for which a table entry exists. At block 906, MCU 122 can set the pulse width for each PWM driver channel using the baseline pulse width parameters. For example, if the pulse period is 256 CPU clock cycles, each of L[0], L[1], L[2] can be an 8-bit value (0 to 255) indicating the number of clock cycles corresponding to the pulse width.

At block 908, MCU 122 can determine the number of pulses ($N_{ON}$) to send per pulse train (where each pulse train includes $N_B$ consecutive pulse periods) based on the target brightness determined at block 902. For example, for maximum brightness, all $N_B$ possible pulses can be sent on each channel ($N_{ON}=N_B$); for 50% brightness, $N_{ON}=N_B/2$ pulses would be sent, and so on. Linear scaling can be used.

At block 910, MCU 122 can generate a pulse train on each channel for one brightness cycle. As described above, in some embodiments, for each channel, pulses are generated for the first $N_{ON}$ pulse periods of a pulse train, and no pulses are generated for the remaining $N_B-N_{ON}$ pulse periods. In other embodiments, MCU 122 can generate pulses for a different subset of $N_{ON}$ pulses within the $N_B$-period pulse train (e.g., skipping pulse periods according to some pattern such that $N_{ON}$ pulses are relatively evenly distributed across the $N_B$ pulse periods of the pulse train).

At block 912, at the end of a brightness cycle, MCU 122 can determine whether the CCT and/or brightness settings have changed. If not, then MCU 122 can use the current pulse parameters (pulse width and $N_{ON}$ for each channel) to generate another set of pulse trains for another brightness cycle at block 910. If any settings have changed, MCU 122 can return to block 902 to update the pulse parameters based on the new settings. It should be noted that in some embodiments, MCU 122 can determine new pulse parameter values for a next brightness cycle while a current brightness cycle is in progress and store the new values in a buffer, then transfer the buffered parameter values into active control registers of the PWM output drivers before the next brightness cycle begins. Buffering new parameter values can minimize any idle time between brightness cycles while preventing visible artifacts that may occur if parameter values are changed in the middle of a brightness cycle.

Process 900 allows brightness and/or color temperature to be changed in discrete steps and can be limited by the resolution of the lookup table and/or the number of brightness settings ($N_B$ possible options). To increase the tunability of the light source, in some embodiments the control logic in the MCU can interpolate between CCT and/or brightness levels. In such embodiments, the color temperature and overall brightness can be controlled through a combination of relative pulse widths and number of pulses in the per-channel pulse trains.

Figure 10:
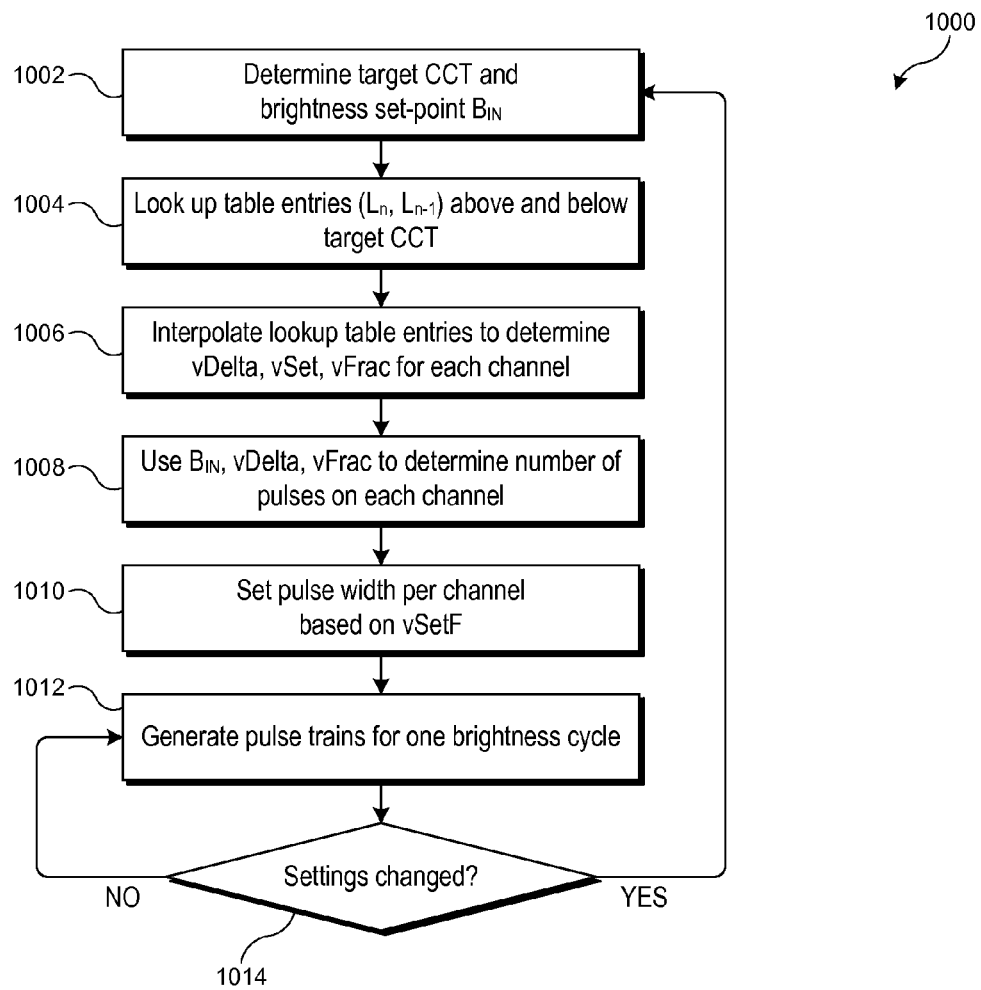
FIG. 10 is a flow diagram of a process for pulse generation according to another embodiment of the present invention.

FIG. 10 is a flow diagram of a process 1000 for pulse generation according to an embodiment of the present invention that uses interpolation to fine-tune CCT and brightness. Like process 900, process 1000 can be implemented, e.g., in control logic 508 of MCU 522. At block 1002, process 1000 can determine a target CCT (tCCT) and brightness set-point ($B_{IN}$); this can be similar to block 902 of process 900 described above. In one embodiment, the target CCT is specified using Kelvin scale color temperatures, and the brightness is specified as an integer in a range from 0 to 1023 (10 bits).

At block 1004, MCU 122 can look up color temperatures above and below the target CCT (denoted $CCT_n$ and $CCT_{(n-1)}$) in a lookup table of relative current values, to obtain two baseline pulse width values for each channel (the two values for one channel are denoted herein as $L_n$ and $L_{(n-1)}$). At block 1006, MCU 122 can interpolate between the two baseline pulse width values for a given channel to determine parameters vDelta, vSet, and vFrac. In one embodiment, these parameters are defined for a single channel by the following pseudocode:

```
vDelta = L_n - L_(n-1);
vv = vDelta * [(tCCT - CCT_n) << 8]/[CCT_n - CCT_(n-1)] + [L_n << 8];
vSet = 8 most significant bits of vv;
vFrac = 8 least significant bits of vv.
```

At block 1008, MCU 122 can use $B_{IN}$, vDelta, and vFrac to determine the number of pulses to include in a pulse train. In some embodiment, the number of pulses and pulse width are used in a coordinated fashion to control color mixing and brightness. For example, in one embodiment, an interpolation factor sInterP can be defined using the following pseudocode:

```
if (vDelta > 0 && vDelta < 4) sInterP = vFrac/vDelta
else sInterP = 1.
```

In one embodiment, pulse width and/or number of pulses can be constrained by a range limit on the current regulator; for instance, as noted above $V_{ADJ}$ may be required to be at least 10% of $V_{REF}$ in order to generate any current, and this can imply a minimum number of pulses per pulse train and/or minimum pulse width to keep $V_{ADJ}$ above this threshold. Accordingly, in one embodiment, a pulse width value vDrvMin is defined that corresponds to $V_{ADJ}$ at threshold, and a floor under pulse width vSet can be established, e.g., using the following pseudocode:

```
if (vSet < vDrvMin) {
    sDrvLimit = vSet/vDrvMin;
    vSetF = 1;
}
else {
    sDrvLimit = 1;
    vSetF = vSet;
}
```

Then one can compute a pulse count $B_{FINAL}$:

$$B_{FINAL}=B_{IN}*sInterP*sDrvLimit.$$

$B_{FINAL}$ can be used to determine the number of pulses ($N_{ON}$) to be included in a pulse train of $N_B$ pulses. For example, in some embodiments $B_{FINAL}$ is a 10-bit number, and there are 128 pulse periods in a brightness cycle. Accordingly, the seven most significant bits (MSBs) of $B_{FINAL}$ can be used to select the number of pulses $N_{ON}$. As described below, the three least significant bits (LSBs) of $B_{FINAL}$ can be used to dither the number of pulses per brightness cycle between $N_{ON}$ and $N_{ON}+1$ over a sequence of brightness cycles, allowing for further fine-tuning of color and brightness.

At block 1010, MCU 122 can set the pulse width for each channel based on the final pulse width vSetF for that channel. For example, if a pulse period is 256 CPU clocks, then vSetF can directly indicate the number of clock cycles corresponding to the pulse width.

It is to be understood that the computations at blocks 1006, 1008, and 1010 are performed independently for each channel, to produce a final pulse width vSetF and pulse count $B_{FINAL}$ for the pulse train in each channel. Process 1000 inherently controls relative brightness to achieve the desired color mix because the same target CCT and brightness set-point $B_{IN}$ are applied to each channel.

At block 1012, MCU 122 can generate a pulse train on each channel for one brightness cycle. As described above, in some embodiments, for each channel, pulses are generated for the first $N_{ON}$ pulse periods of a pulse train, and no pulses are generated for the remaining pulse periods. In other embodiments, MCU 122 can generate pulses for a different subset of $N_{ON}$ pulse periods within the $N_B$-period pulse train (e.g., skipping pulse periods according to some pattern such that the $N_{ON}$ pulses are relatively evenly distributed across the $N_B$ pulse periods of the pulse train).

At block 1014, at the end of a brightness cycle, MCU 122 can determine whether the CCT and/or brightness settings have changed. If not, then MCU 122 can use the current pulse parameters to generate another set of pulse trains for another brightness cycle at block 1012. If any settings have changed, MCU 122 can return to block 1002 to update the pulse parameters based on the new settings. It should be noted that in some embodiments, MCU 122 can determine and buffer pulse parameters for a next brightness cycle while a current brightness cycle is in progress, then transfer the buffered parameters into active control registers of the PWM output drivers before the next brightness cycle begins; this can minimize any idle time between brightness cycles.

It will be appreciated that pulse-parameter computation processes described herein are illustrative and that variations and modifications are possible. Steps described as sequential may be executed in parallel, order of steps may be varied, and steps may be modified, combined, added or omitted. For instance, the particular computations described are illustrative, order of computations can be varied, and computations can be performed in parallel or sequentially as desired, limited only by logical dependencies among computational steps. All numerical values, bit-field widths, and the like are provided for purposes of illustration and are not intended to be limiting.

As noted above, in some instances, generating the pulses can incorporate dithering the number of pulses in each channel based on the LSBs of $B_{FINAL}$ in that channel. FIG. 11 illustrates a set of dither masks 1100 that can be defined to facilitate dithering according to an embodiment of the present invention. In this example, each dither mask is 8 bits, and a different dither mask is assigned to each possible combination of LSBs of $B_{FINAL}$ (column 1102).

The dither mask 1100 can be used to define a dither bit for each brightness cycle that is either set (nonzero) or not set (zero); successive brightness cycles can read successive bits of the dither mask. For example, in the case where the LSBs of $B_{FINAL}$ are 100, the dither bit will alternate between set and not set.

Figure 12:
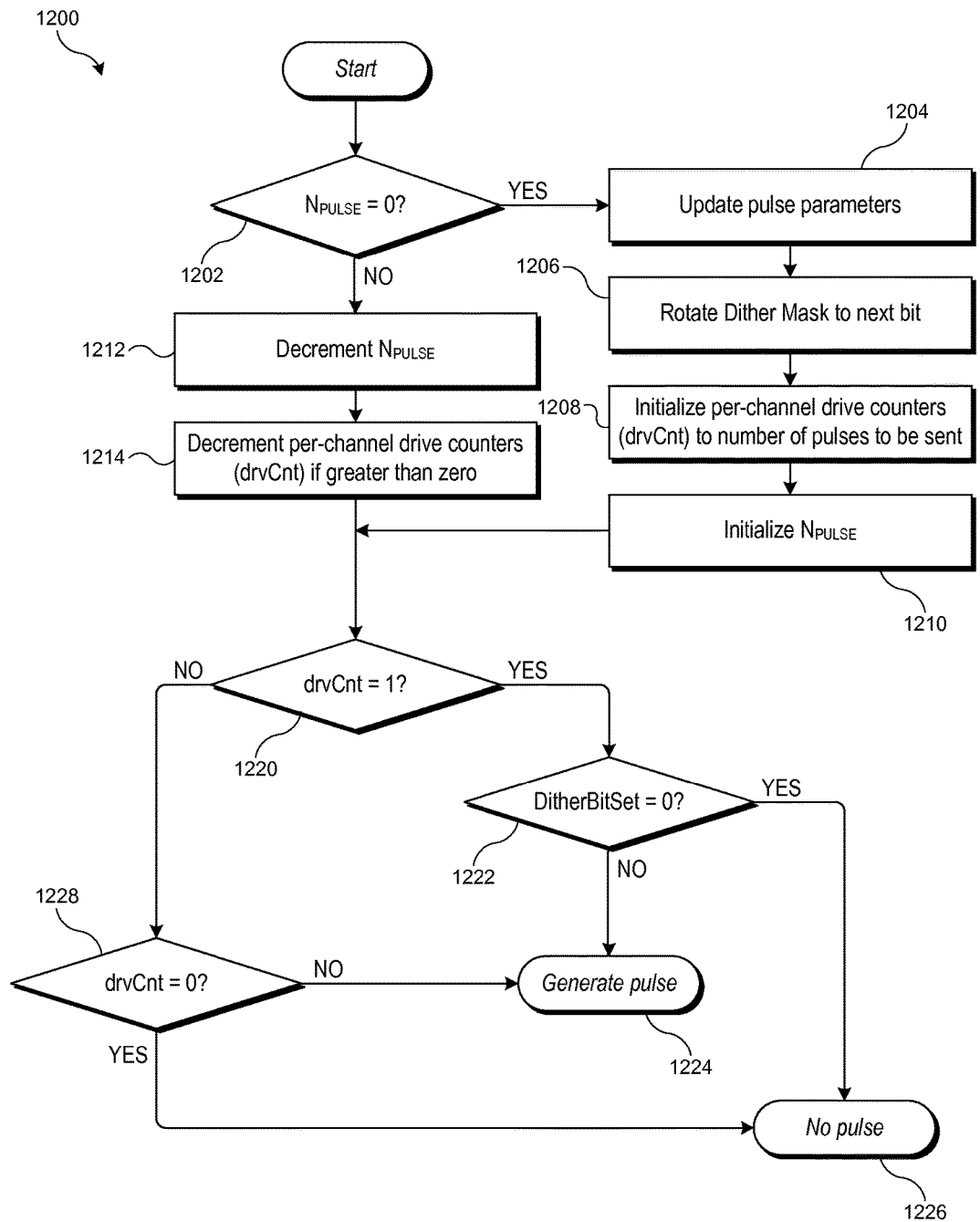
FIG. 12 is a flow diagram of a process for generating pulses for a brightness cycle according to an embodiment of the present invention.

FIG. 12 is a flow diagram of a process 1200 for generating pulses for a brightness cycle according to an embodiment of the present invention. Process 1200 can be implemented, e.g., at block 1012 of FIG. 10 described above. In some embodiments, process 1200 can be implemented as an interrupt service routine that is invoked at regular intervals (e.g., once per pulse period) to generate or not generate a pulse on each channel.

Process 1200 uses a pulse counter $N_{PULSE}$ to determine when a brightness cycle has ended. At block 1202, process 1200 can determine whether a brightness cycle has ended, e.g., by determining whether $N_{PULSE}=0$. If so, then process 1200 can prepare for the next cycle. For example, at block 1204, process 1200 can update the pulse parameters. The updated parameters can be computed, e.g., using process 1000 described above. As described above, process 1000 can compute and buffer new parameter values while a brightness cycle is in progress, and block 1204 can include transferring pulse parameter values from a buffer to active registers of the pulse generator for each channel.

At block 1206, process 1200 can rotate the dither mask for each channel to the next dither bit. In one embodiment, this is done by updating an 8-bit variable dither_m that is initialized to 1. The following pseudocode can be used to rotate the dither mask for a channel:

```
dither_m <<= 1;
if (dither_m == 0) dither_m = 1;
ditherBitSet = (ditherMask & dither_m).
```

Here, ditherMask can be the dither mask from FIG. 11, which can be selected on the basis of the 3 LSBs of $B_{FINAL}$ as described above. It should be noted that if the pulse parameters have changed (at block 1204), the dither mask can change while dither_m continues to rotate through its 8 possible states. The same dither_m can be applied to all channels while a channel-specific ditherMask is selected based on the least-significant bits of $B_{FINAL}$ in that channel, providing each channel with its own ditherBitSet.

At block 1208, process 1200 can initialize a drive counter (drvCnt) for each channel to the number $N_{ON}$ of pulses to be generated in the pulse train, e.g., as determined from the MSBs of $B_{FINAL}$. In some embodiments, this initialization is done without regard to the state of the dither bit (ditherBitSet); dithering is applied as described below.

At block 1210, process 1200 can initialize the pulse counter $N_{PULSE}$ to the number of pulse periods in the pulse train for a brightness cycle. In some embodiments, this initial value is a constant (e.g., 128).

Referring again to block 1202, if it is not the end of a brightness cycle, then at block 1212, process 1200 can decrement $N_{PULSE}$, and at block 1214, process 1200 can decrement any per-channel drive counters (drvCnt) that are greater than 0.

At block 1220, process 1200 can determine, for each channel, whether drvCnt has counted down to 1. If so, then dithering becomes an option, and at block 1222, process 1200 can determine whether the dither bit is set for this channel. If the dither bit is set, then at block 1224 a pulse is generated; if not, then at block 1226, no pulse is generated. Where a pulse is generated, the pulse width can be determined using final pulse width vSetF as defined above.

If, at block 1220, drvCnt is not 1, then at block 1228, process 1200 can determine whether drvCnt has counted down to 0. If not, then at block 1224, a pulse is generated; if so, then at block 1226, no pulse is generated. Where a pulse is generated, the pulse width can be determined using final pulse width vSetF as defined above.

Process 1200 can be repeated for each of the $N_B$ pulse periods of a brightness cycle to generate a pulse train in each channel. Accordingly, the first $N_{ON}$ pulses are generated, and the remaining $N_B - N_{ON}$ pulses are not generated (plus or minus the dithered pulse). It is to be understood that while steps of process 1200 can be performed for each channel independently (e.g., determining whether drvCnt is zero or whether ditherBitSet is zero), the pulse periods and the beginning/end of each brightness cycle can be synchronized across channels.

It will be appreciated that the pulse generation process of FIG. 12 is illustrative and that variations and modifications are possible. Steps described as sequential may be executed in parallel, order of steps may be varied, and steps may be modified, combined, added or omitted. For instance, different logic can be used to determine when to generate the $N_{ON}$ pulses (or $N_{ON}+1$ in the case of dithering) in a particular channel, e.g., to spread the $N_{ON}$ pulses across the NB periods of the brightness cycle, to generate the last $N_{ON}$ pulses rather than the first $N_{ON}$, or the like. Dithering can be performed or not in each channel as desired.

In some embodiments, dithering can be partially or completely suppressed if the brightness is low, e.g., to avoid flickering effects that may become perceptible to the human eye. For example, dithering can be based on two LSBs rather than three for brightness less than 3% of maximum, one LSB for brightness less than 2% of maximum, and turned off entirely for brightness less than 1% of maximum. Other rules for suppressing dithering can also be used.

In the embodiments described above, a user can change the brightness setting and/or target color temperature at any time, and changes are implemented at the beginning of the next brightness cycle. LEDs can respond very quickly (e.g., in less than a microsecond) to changes in operating current. Consequently, where the brightness cycle is short (e.g., 244 Hz in examples described herein), the transition to new settings can be imperceptible to the human eye, which may perceive a discontinuous jump in the light source's output.

While discontinuous jumps are perfectly acceptable from a technical and safety point of view, users are generally more accustomed to the dimming behavior of conventional light sources such as halogen or incandescent light sources, which respond to a change in input current over a perceptible time interval; thus, from an esthetic perspective, users may find abrupt transitions in the brightness disconcerting. Accordingly, in some embodiments of the present invention, the MCU can implement a gradual transition in brightness and/or color temperature in response to user input (referred to as "smooth dimming"). For example, when the user changes the brightness, MCU 122 can define a "brightness trajectory" from the previous brightness level to the new brightness level. The trajectory can include a sequence of brightness steps (referred to herein as "frames"), each having an assigned brightness value that is intermediate between the two brightness levels. The duration of a frame can be defined to be long enough to be perceptible to a user but short enough to provide a sense of continuous change (e.g., a frame rate of 24 or 30 frames per second). The total duration of the trajectory can be determined based on the magnitude of change in brightness or a predetermined transition time (e.g., 0.5 seconds or 1.0 second), and the number of frames can be determined based on the total duration of the trajectory and the frame rate. For each frame, pulse parameters can be determined based on the brightness level of the frame, and a number of brightness cycles equal to the duration of the frame can be performed before changing the pulse parameter settings to proceed to the next frame.

In some embodiments, the brightness trajectory can be dynamically recalculated, e.g., if the user changes the brightness setting while a trajectory is in progress.

In some embodiments, the brightness trajectory can also specify a color temperature for each frame. For example, conventional light sources such as halogen or incandescent light bulbs generally produce warmer light (lower CCT) as brightness decreases, and a brightness trajectory can include color temperature adjustments to mimic this effect.

Figure 13:
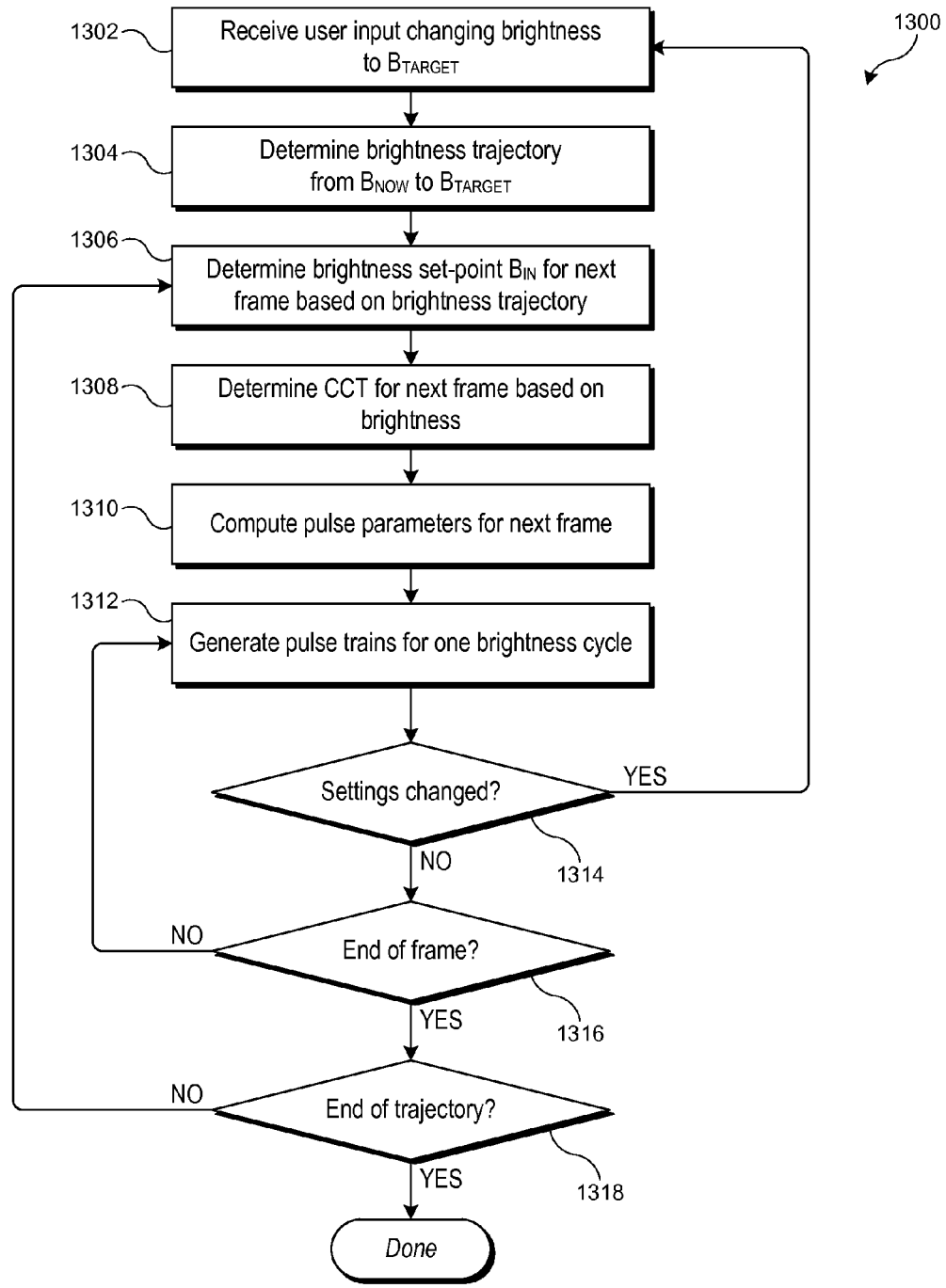
FIG. 13 is a flow diagram of a process for adjusting brightness and color temperature using a brightness trajectory to provide smooth dimming according to an embodiment of the present invention.

FIG. 13 is a flow diagram of a process 1300 for adjusting brightness and color temperature using a brightness trajectory to provide smooth dimming according to an embodiment of the present invention. Process 1300 can begin at block 1302, when process 1300 receives user input indicating that brightness should be changed from its current setting ($B_{NOW}$) to a new setting ($B_{TARGET}$).

At block 1304, process 1300 can determine a brightness trajectory for a transition from $B_{NOW}$ to $B_{TARGET}$. In one embodiment, the brightness trajectory is determined by assuming that the transition should take a fixed amount of time (e.g., 0.5 seconds or 1.0 seconds or the like) and dividing that time across a number of frames having a desired frame rate (e.g., 24 or 30 frames per second) to determine a number of frames $F_{TOT}$ to include in the trajectory. For example, an 0.5-second transition at 24 frames per second would provide a 12-frame trajectory; a 1.0-second transition at 30 frames per second would provide a 30-frame trajectory.

For each frame f a corresponding brightness level $B_f$ can be calculated. For example, linear interpolation can be used:

$$B_f = B_{NOW} + f(B_{TARGET} - B_{NOW})/F_{TOT}.$$

At block 1306, a brightness set-point $B_{IN}$ for the next frame is determined from the brightness trajectory. For instance, if the next frame is f, the set point can just be $B_{IN} = B_f$.

At block 1308, a frame-specific color temperature (CCT) can be determined for the next frame based on the brightness assigned to that frame. For example, a lookup table correlating CCT with brightness can be used. Alternatively, a correlation metric between brightness and CCT can be defined, e.g., CCT decreases (warms) at a certain rate as brightness decreases. Varying CCT with brightness allows, for example, the light to automatically warm as the brightness decreases (and conversely to cool as brightness increases). In some embodiments, the behavior of halogen or incandescent lamps can be modeled by assigning specific color temperatures to specific brightness set-points. In other embodiments, CCT can be treated independently of brightness and held constant during dimming unless the user actively changes it.

At block 1310, process 1300 can compute the pulse parameters for the next frame based on the frame's brightness set point and CCT. The computation can be similar or identical to blocks 1004 to 1010 of process 1000 described above. At block 1312, process 1300 can generate the pulse trains for a brightness cycle. Process 1200 described above or other processes can be used.

At block 1314, process 1300 can determine whether the user has changed the CCT and/or brightness settings. For example, when using smooth dimming, the user may decide that the dimming is going too far and nudge the brightness control back in the other direction, even before the final brightness is reached. If any settings have changed, process 1300 can return to block 1302 to receive the new brightness target and recompute the brightness trajectory.

If the settings have not changed, then at block 1316, process 1300 can determine whether the end of the frame has been reached. For example, based on the frame rate and the length of a brightness cycle, a frame duration can be defined in terms of a number of brightness cycles, and process 1300 can keep track of whether that number of brightness cycles has been performed with the parameter settings for the current frame. If the frame has not ended, then process 1300 can return to block 1312 to generate pulses for the next brightness cycle of the current frame.

Once the frame ends, process 1300 can determine whether the end of the brightness trajectory has been reached. For example, process 1300 can count the number of frames of the trajectory that have been generated to determine whether the last frame has been completed. If more frames remain, then process 1300 can return to block 1306 to determine parameters for a new frame. When the last frame of the trajectory has been completed, process 1300 can end, and the microcontroller can continue operating with the current parameters until new user input is received.

It will be appreciated that the smooth-dimming process of FIG. 13 is illustrative and that variations and modifications are possible. Steps described as sequential may be executed in parallel, order of steps may be varied, and steps may be modified, combined, added or omitted. Algorithms other than linear interpolation can be used to compute brightness values for a frame. As one example, the brightness of a halogen or incandescent lamp changes more slowly when it is at high brightness, and this can be modeled in the computation of $B_f$, e.g., by making the brightness change between successive frames a function of the brightness of the earlier frame. Different frames of a brightness trajectory can have different durations. Thus, for example, the property that brightness of a halogen lamp changes more slowly when it is at high brightness than at low brightness can be modeled by selecting frame durations based in part on brightness levels along the trajectory.

As noted above, CCT can be adjusted along with brightness to emulate the known behavior of halogen light sources. In one embodiment, CCT can be set to 1900 K at 2% brightness, 2100 K at 5%, and continuing up to 3000 K at 100% brightness. In some embodiments, a light source module can be placed into a halogen emulation mode, in which a lookup table is used to set CCT based on the brightness setting, and in this mode CCT need not be an adjustable parameter. Other types of light sources, such as incandescent light bulbs, can also be emulated in a similar manner.

Those skilled in the art with access to the present disclosure will recognize that a similar process can be implemented to provide smooth changes in CCT over perceptible time, even in a context where brightness is not changing. In this case, the trajectory can be a CCT trajectory rather than a brightness trajectory.

In some embodiments, the brightness of an LED operated at constant current can be affected by its operating temperature. For typical LEDs, higher operating temperature correlates with decreased brightness. To the extent that all of the LED groups in emitter 102 are affected to the same degree by temperature changes, a change in operating temperature does not noticeably affect the color temperature of the light but can affect overall brightness. However, to the extent that different LED groups respond differently, a change in operating temperature can affect color temperature, and the effect can become noticeable.

To maintain constant color temperature in the presence of operating-temperature changes, some embodiments of the present invention can incorporate a temperature sensor that monitors the operating temperature of the LEDs. For example, a temperature sensor can be placed on the floor of recess region 212 of FIG. 2, on a bottom surface of emitter substrate 202, or in another location where temperature is expected to vary as a function of operating temperature of the LEDs. MCU 122 can receive a temperature signal from the sensor and can adjust brightness levels based on the received signal. MCU 122 can respond to changes in temperature rather than absolute temperature, and it is not required that the temperature sensor measure the actual operating temperature of the LEDs, provided that changes in the temperature sensor's readings correlate reliably with changes in the operating temperature of the LEDs.

Figure 14:
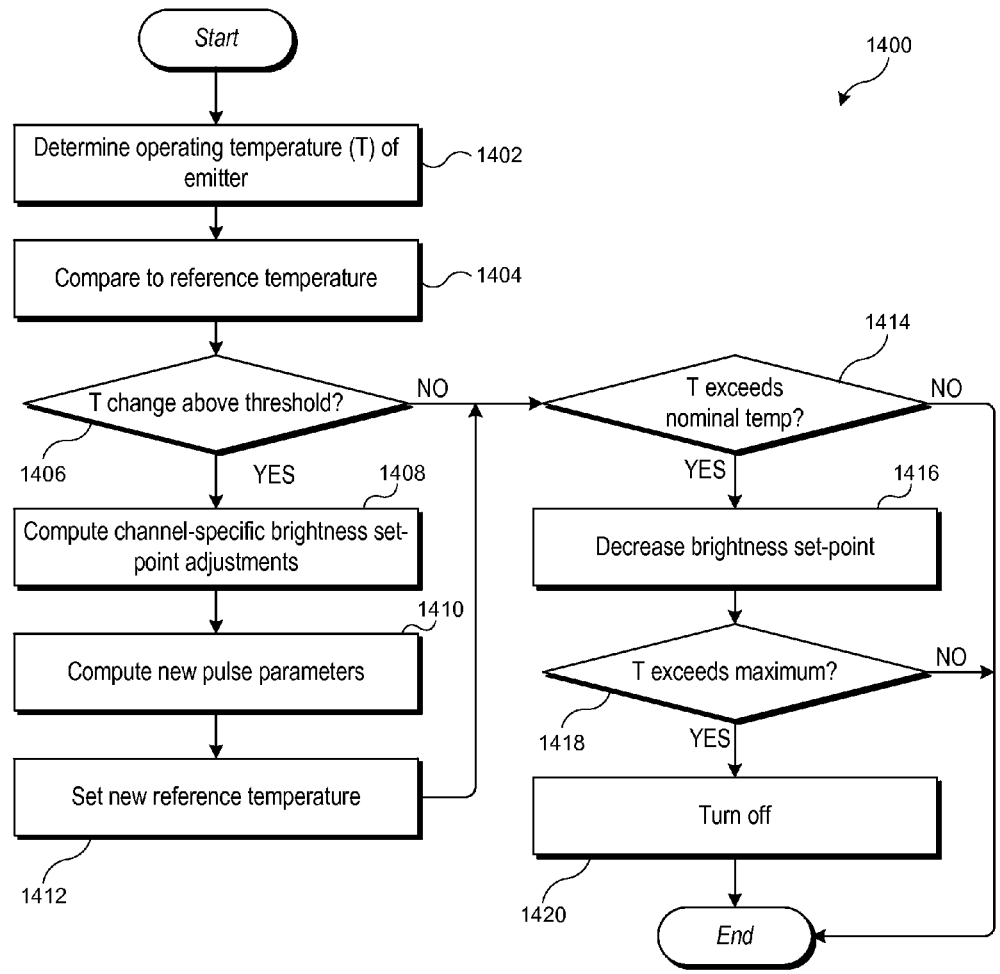
FIG. 14 is a flow diagram of a process for adjusting brightness based on LED operating temperature according to an embodiment of the present invention

FIG. 14 is a flow diagram of a process 1400 for adjusting brightness based on LED operating temperature that can be implemented in MCU 122 according to an embodiment of the present invention. Process 1400 can be performed periodically, e.g., every few seconds, or often enough to detect temperature changes before they have a visible effect.

At block 1402, process 1400 can determine a current operating temperature (T) for the emitter. In some embodiments, a temperature sensor reading is used directly as representative of the current operating temperature. At block 1404, the current operating temperature can be compared to a reference temperature, which can be determined from a previous execution of process 1400, as described below.

At block 1406, process 1400 can determine whether the operating temperature has changed from the reference temperature by a large enough amount to have a significant effect on light output. The threshold for defining a significant effect can be specified as desired. For example, a "significant" effect in this context can be an effect that is just at or below the threshold of human perception. Specific criteria depend in part on the type of LEDs used. For example, the brightness of certain red LEDs decreases linearly with increasing temperature, e.g., with a 50% decrease from maximum occurring under an operating temperature change of 60° C. If a brightness change of 1% is considered the threshold for significance, then a temperature change of 1.2° C. can be the threshold. As another example, for certain whitish or yellowish LEDs fabricated using blue LEDs and yellow phosphors, brightness decreases by about 1% for every 10° C. increase in temperature, up to about 75° C.; above 75° C., the brightness decreases faster, e.g., about 1.5% for every 10° C. Appropriate temperature-change thresholds can be set for each LED group based on a brightness/temperature curve determined for that group, e.g., based on performance analysis of representative samples of LEDs of each type used. Different groups can have different thresholds.

At block 1408, if the temperature change exceeds the threshold, the brightness set-point of one or more channels can be adjusted to maintain a constant color temperature. For instance, if the brightness of red LEDs decreases more strongly with increasing temperature than that of the whitish or yellowish LEDs, then a larger adjustment can be made to the red channel as temperature increases, so that the color mix remains constant. This adjustment can be applied to the brightness set-point for a channel and can saturate at maximum brightness (or at minimum brightness in cases where the current regulator has a lower limit on its output current, e.g., as described above).

At block 1410, the new brightness set-point can be used to adjust pulse parameters, e.g., in accordance with process 900 of FIG. 9 or process 1000 of FIG. 10. At block 1412, the current operating temperature can be set as a new reference temperature for future iterations of process 1400.

In some embodiments, process 1400 can also include monitoring to make sure the operating temperature of the LEDs remains within acceptable limits, to prevent overheating. For example, at block 1414, process 1400 can determine whether the current operating temperature exceeds a specified nominal operating temperature; if so, then at block 1416, process 1400 can decrease the brightness set point (on all channels) and therefore the operating current. Decreasing the operating current can help to reduce the operating temperature, which can increase light output of the LEDs, so the actual loss in output brightness is not necessarily large.

At block 1418, process 1400 can determine whether the current operating temperature exceeds a maximum temperature (e.g., a temperature above which damage to the LEDs is possible if operation continues). If so, then at block 1420, process 1400 can turn off the LEDs, e.g., by setting the brightness set-point to zero, allowing the device to cool down before the LEDs become damaged. It should be noted that with the use of standard thermal management technology (e.g., heat sinks, thermally conductive substrate 102 and PCB 104) and appropriate limits on the maximum current supplied to the LEDs, it is generally possible to keep the device from reaching the maximum temperature during operation, even over prolonged periods of use.

It will be appreciated that process 1400 is illustrative and that variations and modifications are possible. Steps described as sequential may be executed in parallel, order of steps may be varied, and steps may be modified, combined, added or omitted. Temperature-monitoring cycles can be performed once per brightness cycle, or less frequently since temperature is generally expected to change relatively slowly compared to brightness cycle times.

While the invention has been described with respect to specific embodiments, one skilled in the art will recognize that numerous modifications are possible, and that components, features and options described with reference to different embodiments can be combined. All numerical values and dimensions are provided for purposes of illustration and can be modified as desired.

For example, embodiments described herein include control circuits with three channels to independently supply operating current to three groups of LEDs. It is to be understood that any number of channels (and groups of LEDs) can be implemented. For example, some embodiments can use four groups of LEDs. Further, while the embodiments described above may use a particular combination of LEDs (e.g., red, whitish, and yellowish), other color combinations can also be used, such as red, green, and blue (three channels); red, green, whitish, and yellowish (four channels); red green, blue, and yellowish (four channels); or other combinations.

The control circuits described above can be constructed using low-cost off-the-shelf components. For example, a low-cost, low-power microcontroller can implement the control algorithms described above. Thus, the cost of manufacturing and operating the light source module can be kept low. However, other implementations of control circuits and algorithms may be substituted.

In the examples described above, control signals for color temperature and/or brightness can be provided to the microcontroller via a connector as shown. In some embodiments, the connector can be connected to an external electromechanical control device, such as a knob or slider that can produce various signal levels between a minimum and maximum value. Separate control devices can be provided for CCT and brightness settings. In other embodiments, the connector can be connected to an external control device that provides a digital interface, which can include control buttons, knobs, sliders or the like operable to increase or decrease brightness and/or color temperature (e.g., in digitized increments); a display screen with a graphical user interface that allows the user to operate on-screen control elements to adjust settings; or the like. The external control device can generate control signals formatted according to a protocol recognized by the microcontroller, such as $I^2C$ or various serial protocols.

In some embodiments, the external control device can include an external interface module that connects to the connector of the light-source module and a physically distinct user-interface device that that communicates wirelessly with the external interface module, e.g., using RF protocols such as Bluetooth, Wi-Fi, infrared signaling, or the like. The user-interface device can be a special-purpose device, or it can be a programmable device such as a smart phone or tablet computer that executes an application program to communicate with the light source. The external interface module can translate signals received from the user-interface device into a protocol recognized by the MCU. In still other embodiments, a wireless signal transceiver (e.g., an RF transceiver) can be mounted on PCB 106 or elsewhere within the light-source module, and the user can operate a user-interface device that communicates directly with the onboard transceiver.

Further, control signals for color temperature and/or brightness can be generated automatically. For instance, a timer system can automatically change the color temperature and/or brightness based on time of day (e.g., cooler and brighter lights in the day, warmer and dimmer at night). As another example, sensor-based feedback system can automatically adjust color temperature and/or brightness settings based on detected ambient light. Automated control devices can be programmed to provide appropriate control signals over time, and real-time user interaction is not required. Those skilled in the art will recognize that control algorithms as described herein can be implemented without regard for the manner in which the control signals are generated.

Embodiments of the present invention can be realized using any combination of dedicated components and/or programmable processors (e.g., microcontrollers) and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as a microcontroller or other microprocessor) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device (e.g., encoded in ROM within the light source module), or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of controlling brightness and color temperature in a light source device having a plurality of independently addressable groups of LEDs, wherein the LEDs in each group emit light of a different color, the method comprising:
   receiving a control signal indicating that a brightness of the light source should be changed from a starting brightness value to a target brightness value;
   defining a brightness trajectory from the current brightness value to the target brightness value, the brightness trajectory consisting of a sequence of frames, each frame having a different brightness value assigned thereto and a duration that is long enough to be perceptible to a human eye; and
   executing the brightness trajectory, wherein executing the brightness trajectory includes, for each frame in the sequence of frames:
      determining, using a microcontroller, a brightness set-point for the current frame based at least in part on the brightness trajectory;
      computing, for each of a plurality of output channels of the microcontroller, a pulse width and a number of pulses to include in a pulse train to be generated on each of the plurality of output channels during a brightness cycle that is common to all of the output channels, the brightness cycle consisting of a fixed number ($N_B$) of pulse periods, each pulse period having the same duration (p), the pulse train on each output channel consisting of a selectable number ($N_{ON}$) of active pulse periods of duration p during each of which a pulse having a selectable pulse width is generated and another number ($N_B - N_{ON}$) of inactive pulse periods of duration p during which a pulse is not generated, the computation being based at least in part on a current color temperature and the brightness set-point for the current frame such that the pulse width for each output channel is computed based on the current color temperature and the number $N_{ON}$ of active pulse periods is computed based on the brightness set-point,
      wherein selecting the number $N_{ON}$ of active pulse periods and the pulse width for each output channel includes:
         accessing a lookup table using the current color temperature to determine first and second baseline pulse width parameters;
         interpolating between the first and second baseline pulse width parameters to generate a width value consisting of a first subset of most significant bits and a second subset of least significant bits;
         determining the pulse width based at least in part on the most significant bits of the width value; and
         determining the number $N_{ON}$ of pulses to include in the pulse train based at least in part on the brightness set point and the least significant bits of the width value;
      generating, on each of the plurality of output channels, a pulse train using the pulse width and number of pulses computed for that channel;
      converting each of the pulse trains to an operating current;
      delivering each of the operating currents to a different one of the independently addressable groups of LEDs; and
      repeating the acts of generating, converting and delivering for the duration of the frame.

2. The method of claim 1 further comprising:
   after each repetition of generating the pulse train, determining whether the target brightness value has changed; and
   in the event that the target brightness value has changed:
      defining a new brightness trajectory based on the current brightness value and the changed target brightness value; and
      executing the new brightness trajectory.

3. The method of claim 1 wherein defining the brightness trajectory includes selecting a color temperature for each frame based at least in part on the brightness value assigned to each frame.

4. The method of claim 3 wherein the color temperature is selected such that color temperature decreases with decreasing brightness.

5. The method of claim 3 wherein the color temperature for each frame is selected so as to model a dimming behavior of a halogen light source.

6. The method of claim 1 wherein defining the brightness trajectory includes:
   specifying a total duration of the trajectory;
   determining a number of frames based on a preselected frame duration and the total duration of the trajectory; and
   for each frame, linearly interpolating the brightness value between the current brightness value and the target brightness value.

7. The method of claim 6 wherein the total duration of the trajectory is between about 0.5 and about 1.0 seconds.

8. The method of claim 6 wherein the total duration of the trajectory depends at least in part on the difference between the starting brightness value and the target brightness value.

9. The method of claim 1 wherein the duration of each frame is between about 1/30 and about 1/24 of a second.

10. A light source module comprising:
   an emitter having a plurality of LEDs disposed on a single substrate, the plurality of LEDs being electrically connected into at least three independently addressable groups of LEDs, wherein the LEDs in each group emit light of a different color;

a plurality of current regulators, each current regulator being coupled to provide an operating current to a different one of the independently addressable groups of LEDs in response to an adjustable input voltage and a constant reference voltage;

a microcontroller configured to receive input settings specifying a color temperature and a brightness setting and to generate a pulse train on each of a plurality of output channels, each pulse train including a selectable number of pulses having a selectable pulse width, wherein the microcontroller is further configured to select the number of pulses and the pulse width for each output channel based on the input settings; and a plurality of RC integrator circuits, each RC integrator circuit being coupled between a different one of the output channels of the microcontroller and a different one of the plurality of current regulators, each RC integrator circuit being coupled to receive the pulse train from a different one of the output channels of the microcontroller and to provide the adjustable input voltage to a different one of the current regulators, the microcontroller being further configured to:
determine from the received input settings that a brightness of the light source should be changed from a starting brightness value to a target brightness value;
define a brightness trajectory from the current brightness value to the target brightness value, the brightness trajectory consisting of a sequence of frames, each frame having a different brightness value assigned thereto and a duration that is long enough to be perceptible to a human eye; and
execute the brightness trajectory by generating, during each frame, a series of pulse trains based on the brightness value assigned to that frame, wherein generating a series of pulse trains includes computing, for each of the output channels, a pulse width and a number of pulses to include in each pulse train to be generated on that one of the output channels during a brightness cycle that is common to all of the output channels, the brightness cycle consisting of a fixed number ($N_B$) of pulse periods, each pulse period having the same duration (p), the pulse train on each output channel consisting of a selectable number ($N_{ON}$) of active pulse periods of duration p during each of which a pulse having a selectable pulse width is generated and another number ($N_B$–$N_{ON}$) of inactive pulse periods of duration p during which a pulse is not generated, the computation being based at least in part on a current color temperature and the brightness set-point for the current frame such that the pulse width for each output channel is computed based on the current color temperature and the number $N_{ON}$ of active pulse periods is computed based on the brightness set-point, and wherein selecting the number $N_{ON}$ of active pulses and the pulse width for each output channel includes:
accessing a lookup table using the target color temperature to determine first and second baseline pulse width parameters;
interpolating between the first and second baseline pulse width parameters to generate a width value consisting of a first subset of most significant bits and a second subset of least significant bits;
determining the pulse width based at least in part on the most significant bits of the width value; and determining the number $N_{ON}$ of pulses to include in the pulse train based at least in part on the brightness set point and the least significant bits of the width value.

11. The light source module of claim 10 wherein the microcontroller is further configured to select a different color temperature for each of the frames of the brightness trajectory, the color temperature selection being based at least in part on the brightness value assigned to each frame.

12. The light source module of claim 11 wherein the microcontroller is further configured to select the color temperature such that color temperature decreases with decreasing brightness and increases with increasing brightness.

13. The light source module of claim 10 wherein the brightness trajectory is defined to have a total duration between about 0.5 and about 1.0 seconds.

14. The light source module of claim 13 wherein the total duration of the trajectory depends at least in part on the difference between the starting brightness value and the target brightness value.

15. The light source module of claim 10 wherein the duration of each frame is between about 1/30 and about 1/24 of a second.

16. The light source module of claim 10 wherein each pulse train on each output channel has a duration defined as a fixed number of pulse periods and the duration of the pulse train is the same on all of the output channels.

17. The light source module of claim 10 wherein the microcontroller is further configured to dither the selected number of pulses for a given output channel between two adjacent values for different pulse trains.

18. The light source module of claim 10 wherein the independently addressable groups of LEDs include:
a first group comprising one or more red LEDs;
a second group comprising one or more blue LEDs having a first quantity of yellow phosphor disposed thereon to produce whitish light; and
a third group comprising one or more blue LEDs having a second quantity of yellow phosphor disposed thereon to produce yellowish light.

19. The light source module of claim 18 wherein:
the yellowish light corresponds to a first region in a CIE color space, the first region having a CIE-x coordinate between about 0.42 and 0.45 and a CIE-y coordinate between about 0.50 and 0.54;
the whitish light corresponds to a second region in the CIE color space, the second region having a CIE-x coordinate between about 0.31 and 0.34 and a CIE-y coordinate between about 0.34 and 0.37; and
the red light corresponds to a third region in CIE color space, the third region having a CIE-x coordinate between about 0.68 and 0.70 and a CIE-y coordinate between about 0.30 and 0.32.

20. The light source module of claim 10, further comprising a primary lens overlying the plurality of LEDs disposed on the single substrate, the plurality of LEDs being electrically connected into at least three independently addressable groups of LEDs, wherein the LEDs in each group emit light of a different color.

21. The light source module of claim 10 wherein the microcontroller is further configured such that if the selected number $N_{ON}$ of active pulse periods for a particular one of the output channels is less than the number $N_B$ of pulse periods in the brightness cycle, a pulse is generated for each pulse period up to the selected number $N_{ON}$ and no pulse is generated for the remaining $N_B - N_{ON}$ pulse periods.

* * * * *